(12) United States Patent
Brubacher et al.

(10) Patent No.: US 7,467,384 B2
(45) Date of Patent: Dec. 16, 2008

(54) UNIFORM RESOURCE DISCOVERY WITH MULTIPLE COMPUTERS

(75) Inventors: Douglas K. Brubacher, Sammamish, WA (US); Dale Alan Sather, Seattle, WA (US); John M. Gehlsen, Redmond, WA (US); Kenneth Cooper, Renton, WA (US); Kosar Jaff, Kirkland, WA (US); Gary P. Raden, Seattle, WA (US); Ralph Lipe, Yarrow Point, WA (US); Roland Ayala, Woodinville, WA (US); Shannon J. Chan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 11/120,441

(22) Filed: May 2, 2005

(65) Prior Publication Data

US 2006/0026141 A1 Feb. 2, 2006

Related U.S. Application Data

(63) Continuation-in-part of application No. 11/061,291, filed on Feb. 18, 2005, and a continuation-in-part of application No. 11/061,268, filed on Feb. 18, 2005, and a continuation-in-part of application No. 11/060,913, filed on Feb. 18, 2005, and a continuation-in-part of application No. 11/060,912, filed on Feb. 18, 2005.

(60) Provisional application No. 60/567,558, filed on May 3, 2004, provisional application No. 60/546,671, filed on Feb. 20, 2004.

(51) Int. Cl.
*G06F 9/46* (2006.01)

(52) U.S. Cl. ............... 718/104; 719/313; 719/328
(58) Field of Classification Search ............... 718/104; 719/131, 328
See application file for complete search history.

(56) References Cited

U.S. PATENT DOCUMENTS

| 6,098,111 | A | * | 8/2000 | Maegawa et al. | 719/310 |
|---|---|---|---|---|---|
| 6,334,158 | B1 | | 12/2001 | Jennyc et al. | |
| 6,415,333 | B1 | * | 7/2002 | Vasell | 719/315 |
| 6,470,227 | B1 | | 10/2002 | Rangachari et al. | |
| 6,496,864 | B1 | | 12/2002 | McCartney | |
| 6,618,764 | B1 | * | 9/2003 | Shteyn | 709/249 |
| 6,708,210 | B2 | | 3/2004 | Chang et al. | |
| 6,813,633 | B2 | * | 11/2004 | Wong et al. | 709/217 |

(Continued)

FOREIGN PATENT DOCUMENTS

EP 1058422 A1 12/2000

(Continued)

OTHER PUBLICATIONS

Justin Swett, "Use the Windows API to generate a list of available Network Resources", Published Feb. 12, 2001, Obtained from.

(Continued)

*Primary Examiner*—Andy Ho

(57) ABSTRACT

Data associated with a function instance corresponding to a resource on one computer system is published for use on another computer system. A function instance is created on the other computer system using the published data.

20 Claims, 14 Drawing Sheets

U.S. PATENT DOCUMENTS

| | | | |
|---|---|---|---|
| 6,983,326 | B1 | 1/2006 | Vigue et al. |
| 7,165,101 | B2* | 1/2007 | Daniels et al. ............... 709/223 |
| 2003/0018621 | A1 | 1/2003 | Steiner et al. |
| 2003/0055874 | A1 | 3/2003 | Simpson et al. |
| 2003/0120928 | A1 | 6/2003 | Cato et al. |
| 2003/0217136 | A1 | 11/2003 | Cho et al. |
| 2004/0246992 | A1* | 12/2004 | Henry et al. ................ 370/467 |
| 2005/0097087 | A1 | 5/2005 | Punaganti Venkata et al. |
| 2005/0108369 | A1 | 5/2005 | Sather et al. |
| 2005/0160172 | A1 | 7/2005 | Eytchison |
| 2005/0187921 | A1 | 8/2005 | Brubacher et al. |
| 2005/0187922 | A1* | 8/2005 | Brubacher et al. ............. 707/3 |
| 2005/0187924 | A1 | 8/2005 | Brubacher et al. |
| 2005/0192927 | A1 | 9/2005 | Brubacher et al. |
| 2005/0216865 | A1 | 9/2005 | Rollin et al. |
| 2006/0195450 | A1 | 8/2006 | Chatterjee et al. |

FOREIGN PATENT DOCUMENTS

| | | | |
|---|---|---|---|
| WO | 03081428 A2 | 10/2003 | |

OTHER PUBLICATIONS

Yoran Goland et al., "Simple Service Discover Protocol 1.0", Oct. 28, 1999, Internet Engineering Task Force (This reference was previously submitted in an IDS in connection with U.S. Appl. No. 11/061,291, filed Feb. 18, 2005 and is not being resubmitted herewith per 37 CFR 1.98(d).).

"UPnP Device Architecture 1.0" Dec. 2, 2003- version 1.0.1, UPnP Forum.

John Beatty et al., "Web Services Dynamic Discovery", Feb. 2004 (This reference was previously submitted in an IDS in connection with U.S. Appl. No. 11/061,291, filed Feb. 18, 2005 and is not being resubmitted herewith per 37 CFR 1.98(d).).

Shannon Chan et al., "Devices Profile for Web Services", Aug. 2004 (This reference was previously submitted in an IDS in connection with U.S. Appl. No. 11/061,291, filed Feb. 18, 2005 and is not being resubmitted herewith per 37 CFR 1.98(d).).

Erik Christensen et al., "Web Services Description Language (WSDL) 1.1", Mar. 15, 2007, (This reference was previously submitted in an IDS in connection with U.S. Appl. No. 11/061,291, filed Feb. 18, 2005 and is not being resubmitted herewith per 37 CFR 1.98(d).).

* cited by examiner

| API LAYER 400 |
|---|
| CATEGORY OF UNDERLYING FUNCTION INSTANCE(S) 412<br>SUBCATEGORY OF UNDERLYING FUNCTION INSTANCE(S) 414<br>FILTER CRITERIA 416<br>SUPPORTED INTERFACE 418<br>FACTORY 420 |

UNIFORM RESOURCE DISCOVERY WITH MULTIPLE COMPUTERS

CROSS-REFERENCE TO RELATED APPLICATIONS

This application is a continuation-in-part of U.S. patent application Ser. No. 11/060,912, filed on Feb. 18, 2005, U.S. patent application Ser. No. 11/061,268, filed on Feb. 18, 2005, U.S. patent application Ser. No. 11/060,913, filed on Feb. 18, 2005, and U.S. patent application Ser. No. 11/061,291, filed on Feb. 18, 2005, each of which claims the benefit of U.S. Provisional Application 60/546,671, filed Feb. 20, 2004; this application also claims the benefit of U.S. Provisional Application 60/567,558, filed May 3, 2004; all of the aforementioned applications are hereby incorporated herein by reference.

BACKGROUND

Modern computer systems use a wide array of resources, implemented in both hardware and software, such as printers, files, software components, and the like. Each type of resource generally has its own interface for programmatic enumeration, as well as its own interface for general programmatic access. For example, enumerating the devices capable of producing audio output often requires using different interfaces depending on how the audio output devices are connected to the computer system. Furthermore, accessing the same type of resource on another computer system connected via a network often requires the use of yet other interfaces for programmatic enumeration and access. This is troublesome for a wide variety of applications, including those that want to provide a unified view of and access to disparate types of resources, independent of resource type or manner of connection.

SUMMARY

Described herein are various technologies and techniques directed to the discovery and use of computer resources on a single computer system and on multiple computer systems connected by a network. More particularly, described herein are, among other things, systems, methods, and data structures that facilitate the discovery of, and access to, computer resources on a single or multiple computers in a manner that is uniform across disparate types of resources, using a publication and subscription model.

DESCRIPTION OF THE DRAWINGS

FIG. 4 illustrates a generalized representation of one implementation of an API layer.

DETAILED DESCRIPTION

Figure 1:
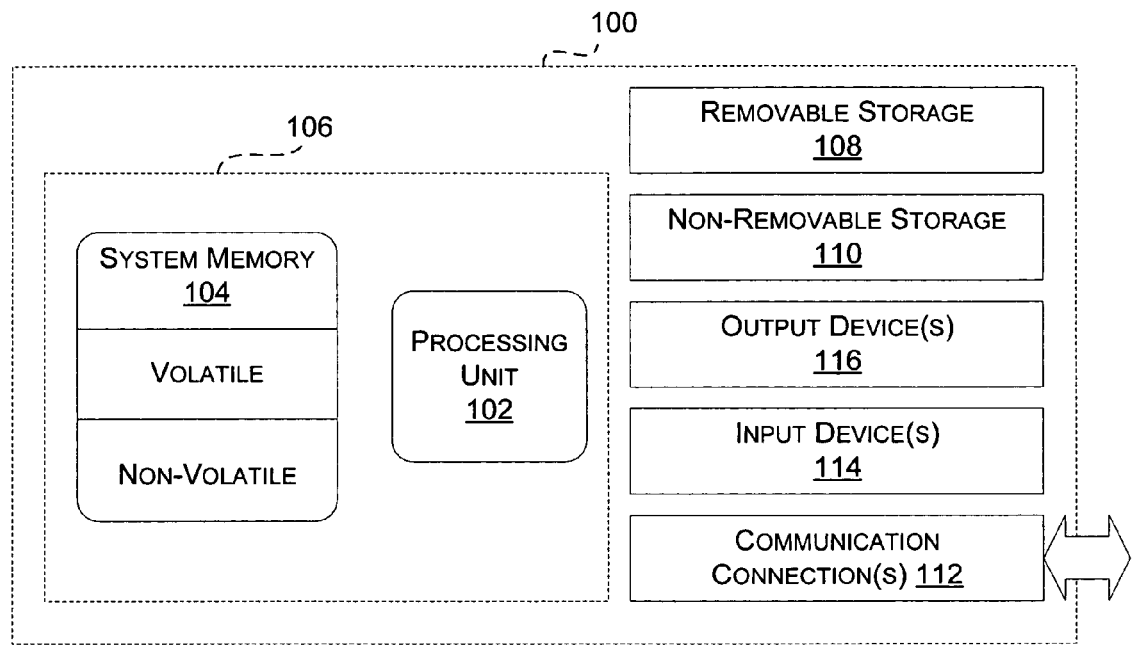
FIG. 1 illustrates an example of one possible computing device in which the various technologies described herein may be implemented.

Described herein are various technologies and techniques directed to the discovery and use of computer resources on a single computer system and on multiple computer systems connected by a communications medium. More particularly, described herein are, among other things, systems, methods, and data structures that facilitate the discovery of, and access to, computer resources on a single or multiple computers in manner that is uniform across disparate types of resources.

Included in the various technologies and techniques described herein is a unique discovery module that enables applications to retrieve information about various resources and access these resources in a uniform manner. In these implementations, the application uses the discovery module to request information about, or access to, one or more resources. In response to the request, the application receives one or more "function instances," each of which is associated with a single resource that satisfies the request. In some implementations, the application may also receive notifications when the resources associated with function instances change.

In some implementations, function instances are created and used on a single computer system. In other implementations, the data associated with function instances created on one computer system is used on another computer system. In such an implementation, a computer system that publishes resources for use by "publication clients" can be called a "publication server." A publication server may contain a publication service that uses a discovery module to obtain function instances that the publication service then makes available to one or more publication clients using a communications medium.

Function instances may have various forms and formats. For example, in some implementations, a function instance is an object that includes or references metadata about its associated resources. In some implementations, a function instance also includes or references some information or mechanism that may be used to activate its associated resource. As used herein, activation refers to creating or making available a programmatic mechanism, such as an API or the like, by which an application may access or use a resource.

Regardless of the particular form or format of function instances, in accordance with the various implementations described herein, function instances will in general have uniform fields, which may contain references to resource metadata and activation data, and a uniform API, enabling users of function instances to interact with function instances in the same manner, regardless of the resources represented by the function instances.

In some implementations, function instances are created using function instance providers. In these implementations, each function instance provider is associated with a given set or type of resources. In these implementations, function instance providers also include appropriate mechanisms to enumerate and create function instances for the set or type of resources associated therewith. For example, and without limitation, one function instance provider may enumerate and create function instances for Universal Plug and Play resources, another function instance provider may enumerate and create function instances for Web Service Discovery resources, yet another function instance provider may enumerate and create function instances for Simple Service Discovery Protocol resources, etc. Furthermore, in some implementations, a particular function instance provider, referred to herein as a subscription provider, may enumerate and create function instances using information about resources received using a communications medium.

In some implementations, the determination as to which function instance provider is appropriate for which kinds of requested resources is made by a provider management module. In general, the provider management module keeps track of the available function instance providers. When a request for function instances is received by the provider management module, for example from the discovery module, the provider management module then selects an appropriate function instance provider to satisfy the request, and sends a request for function instances to the selected function instance provider. The function instance provider then enumerates its associated resources or otherwise queries its resources for information, creates one or more function instances to represent resources that satisfy the request, and returns the function instances to the provider management module.

In accordance with some implementations, a particular type of function instance provider, referred to herein as a mapped function instance provider, presents function instances from multiple other function providers in a uniform manner using configurable categories. Function instances provided by a mapped function instance provider may be referred to more specifically as mapped function instances.

As noted above, in some implementations, each function instance includes or references metadata for its associated resource. In some implementations, applications may access this metadata to obtain an API with which they can interact and control the resource associated with the function instance.

In some implementations, a function instance enables an application to obtain an API for the associated resource in a manner independent of the resource and function instance. In one such implementation, an application may request that a function instance "activate" a specific API. As a result of such a request, data associated with the function instance may be used to create the requested API.

In some implementations, in the case where a particular mapped function instance represents another mapped function instance, a function instance provider may present function instances that support activating multiple APIs. In this implementation, a mapped function instance that represents other mapped function instances may support activating APIs for the function instance it represents, and also support activating APIs for the underlying function instances.

Example Computing Environment

FIG. 1 and the related discussion are intended to provide a brief, general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 100 illustrated in FIG. 1.

Generally, program modules include routines, programs, objects, components, data structures, etc., that perform particular tasks or implement particular abstract data types. Tasks performed by the program modules are described below with the aid of block diagrams and operational flowcharts.

Those skilled in the art can implement the description, block diagrams, and flowcharts in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

Turning now to FIG. 1, in its most basic configuration, the computing device 100 includes at least one processing unit 102 and memory 104. Depending on the exact configuration and type of computing device, the memory 104 may be volatile (such as RAM), non-volatile (such as ROM, flash memory, etc.), or some combination of the two. This most basic configuration is illustrated in FIG. 1 by dashed line 106. Additionally, the computing device 100 may also have additional features/functionality. For example, the computing device 100 may also include additional storage (removable and/or non-removable) including, but not limited to, magnetic or optical disks or tape. Such additional storage is illustrated in FIG. 1 by the removable storage 108 and the non-removable storage 110.

The computing device 100 may also contain communications connection(s) 112 that allow the device to communicate with other devices. The computing device 100 may also have input device(s) 114 such as keyboard, mouse, pen, voice input device, touch input device, etc. Output device(s) 116 such as a display, speakers, printer, etc. may also be included in the computing device 100.

Those skilled in the art will appreciate that the technologies described herein may be practiced with computing devices other than the computing device 100 illustrated in FIG. 1. For example, and without limitation, the technologies described herein may likewise be practiced in hand-held devices, multiprocessor systems, microprocessor-based or programmable consumer electronics, network PCs, minicomputers, mainframe computers, and the like.

The technologies described herein may also be implemented in distributed computing environments where tasks are performed by remote processing devices that are linked through a communications network. In a distributed computing environment, program modules may be located in both local and remote memory storage devices.

While described herein as being implemented in software, it will be appreciated that the technologies described herein may alternatively be implemented all or in part as hardware, firmware, or various combinations of software, hardware, and/or firmware.

Figure 2:
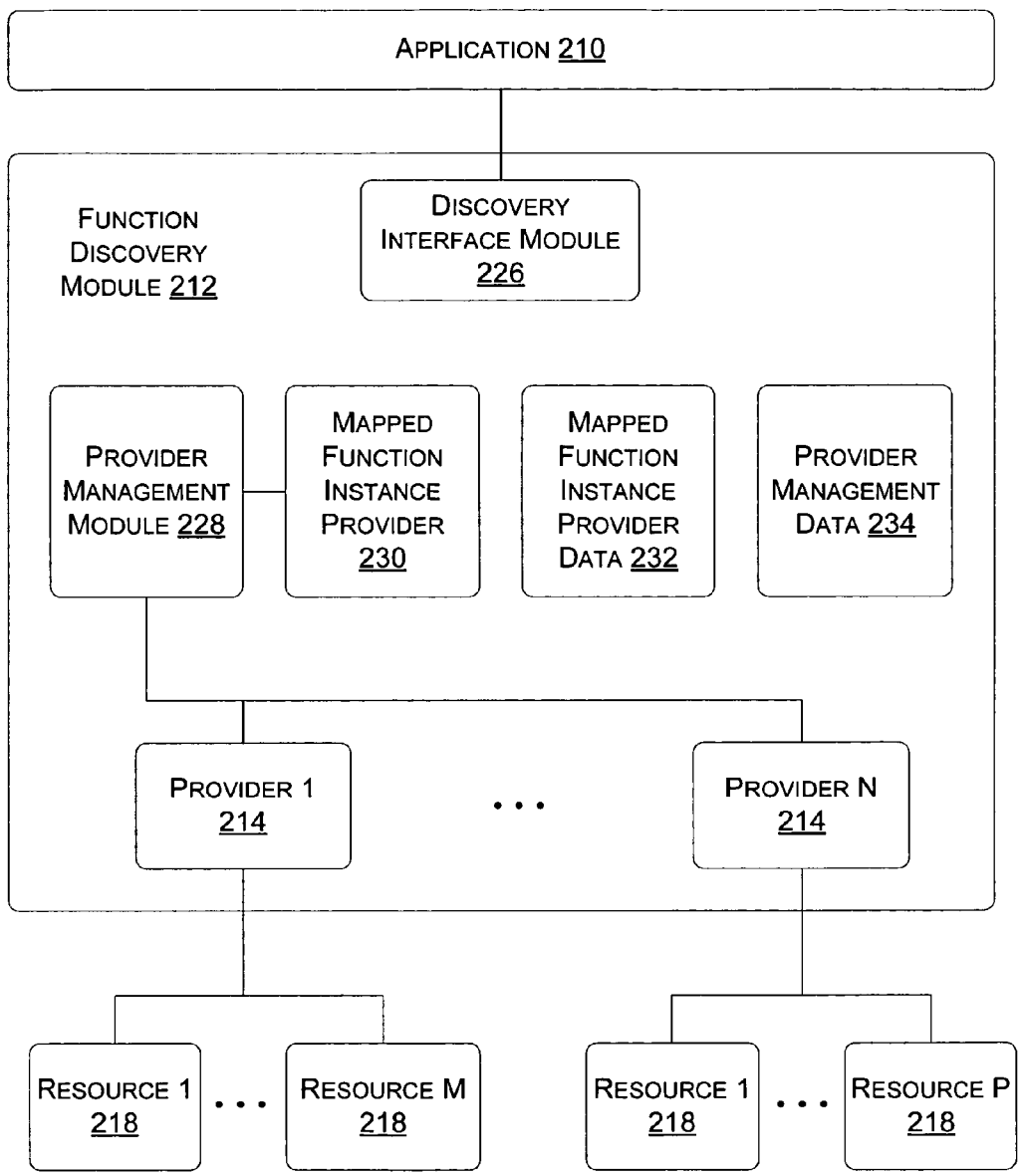
FIG. 2 illustrates one implementation of a system in which uniform resource discovery, as described herein, may be carried out.

Turning now to FIG. 2, illustrated therein is a system 200 in which uniform resource discovery may be carried out. Included in the system are an application 210, a function discovery module 212, and a number of resources 218. Generally, the application 210 may be any program, process, or the like, that is operable to interact with or control the function discovery module 212 and/or one or more resources. In general, a resource 218 may be any hardware, software, or combination of hardware and software that provides functionality to the application.

In accordance with one implementation, the application 210 is a program that displays a graphical representation of available resources. However, those skilled in the art will appreciate that the application can be any process that is operable to communicate with or make use of any resources, for any purpose.

Included in the function discovery module 212 is a discovery interface module 226, a provider management module 228, a number of providers 214, and a mapped function instance provider 230. Also included in the function discovery module 212 are mapped function instance provider data 232 and provider management data 234.

In general, the discovery interface module 226 is a programmatic entity that provides functionality to receive requests from an application 210 and also includes various routines operable to handle the requests. In some implementations, the discovery interface module 226 is operable to communicate with the provider management module 228 to retrieve function instances in response to application requests.

For example, and without limitation, in accordance with one implementation, the discovery interface module 226 comprises an API that includes methods that enable an application 210 to request function instances for specified resources. In response to such a request, the discovery interface module 226 communicates with the provider management module 228 to retrieve function instances that represent the requested resources.

In general, the provider management module 228 is a programmatic entity that accepts requests for function instances from the discovery interface module 226. In some implementations, as described below, the provider management module uses the provider management data 234 and the one or more providers 214 and 230 to retrieve function instances, which the provider management module then returns to the discovery interface module 226.

For example, and without limitation, in accordance with one implementation, the provider management module 228 comprises executable code that responds to requests from the discovery interface module 226 by identifying a provider using information such as the provider management data 234 and the information included with the request. If a provider that can service the request is found, the provider management module 228 requests that the identified provider supply a set of function instances according to the request from the discovery interface module 226.

In general, in one implementation, the providers 214 are programmatic entities that receive requests for function instances from the provider management module 228. In response to a request from the provider management module, a provider enumerates or queries the resources with which it is associated, and creates and returns corresponding function instances to the provider management module. In some implementations, providers might also support activation of application programming interfaces.

In accordance with various implementations described herein, each provider is associated with a predefined set or type of resource. For example, and without limitation, one function instance provider may be associated with Universal Plug and Play resources, another function instance provider may be associated with Web Service Discovery resources, yet another function instance provider may be associated with Simple Service Discovery Protocol resources, etc. Providers may also be associated with multiple resources of varying types.

The particular manner in which a provider 214 enumerates and creates function instances may be dependent on the type of resources with which it is associated. For example, in the case where a provider 214 is associated with Plug and Play resources, upon receipt of a request for a function instance or function instances, the provider module may use a Plug and Play-specific API to enumerate its associated Plug and Play resources. The provider module may then create and return function instances that represent the Plug and Play resources.

In some implementations, the providers 214 and 230 can be supplied by parties other than the party or parties providing the function discovery module 212.

In general, the mapped function instance provider 230 is a particular implementation of a provider 214 that supports the creation of mapped function instances. As used herein, a mapped function instance is a function instance that is associated with at least one other function instance.

The mapped function instance provider 230 receives requests for function instances from the provider management module 228. In response, it creates and returns mapped function instances and, in some implementations, does so using data from the mapped function instance provider data 232. In some of these implementations, the mapped function instance provider data 232 defines mapped function instances and specifies categorization and activation information for such mapped function instances.

For example, and without limitation, in accordance with one implementation, the mapped function instance provider 230 provides a category that supplies a single set of function instances for resources that output audio but are of different underlying types. For example, and without limitation, this category could include Plug and Play audio hardware and Universal Plug and Play media renderer devices. In some implementations, this category information is associated with the mapped function instance provider data 232.

In general, the mapped function instance provider data 232 contains data associated with the mapped function instance provider 230. For example, and without limitation, in accordance with one implementation, the mapped function instance provider data 232 may include a hierarchical set of nodes in a configuration data store (e.g., the registry in various versions of the Windows® operating system, from Microsoft Corporation of Redmond, Wash.). In addition, the mapped function instance provider data 232 may include one or more Extensible Markup Language (XML) fragments in particular nodes, where the nodes represent mapped function instance categories and the XML fragments contain information associated with mapped function instances.

In general, the provider management data 234 contains data associated with the provider management module 228. For example, and without limitation, in accordance with one implementation, the provider management data 234 is a set of XML fragments that contain information associated with function instance requests and providers 214.

It will be appreciated by those skilled in the art that the discovery interface module 226, the provider management module 228, and the various providers 214 and 230 may be implemented using various object-oriented or non-object-oriented technology. The selection of one or another type of object-oriented or non-object-oriented technology is a matter of choice, and is often determined by such things as the underlying operating system, etc.

However, in accordance with some implementations, one or more of the discovery interface module 226, the provider management module 228, and the various providers 214 and 230 are implemented as objects that conform to the Microsoft Component Object Model ("COM") specification. The COM specification defines binary standards for objects and their interfaces, which facilitate the integration of software components into applications.

Figure 3:
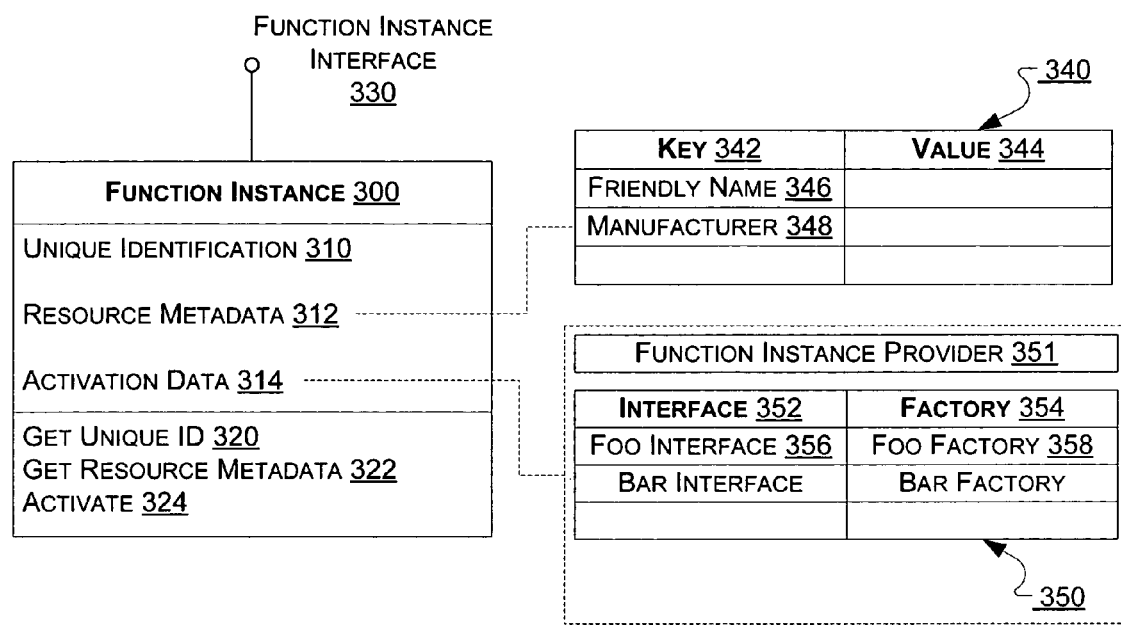
FIG. 3 illustrates a generalized representation of one implementation of a function instance.

Turning now to FIG. 3, shown therein is a generalized representation of a function instance 300. The following description of FIG. 3 is made with reference to the system 200 of FIG. 2. However, it should be understood that the function instance described with respect to FIG. 3 is not intended to be limited to being used by, or interacting with, elements of the system 200.

In general, a function instance 300 represents a resource 218, either directly (e.g., by referencing the resource directly) or indirectly (e.g., by referencing another function instance). Function instances may be used throughout the system 200 to represent and transfer resource and other function discovery information. For example, the provider management module 228 may retrieve function instances 300 from providers 214 and provide function instances to the discovery interface module 226, which provides function instances to the application 210.

A function instance 300 may be implemented as an object in an object-oriented environment and embodied in a computer-readable medium or media. However, it should be understood that the functionality described herein with respect to a function instance object can also be implemented in a non-object-oriented fashion, and can be implemented on many types of systems, both object-oriented and non-object-oriented.

As shown, the function instance 300 includes a unique identification field 310, a resource metadata field 312, and an activation data field 314. Additionally, in some implementations, the function instance implements a function instance interface 330. The interface defines a set of methods that any function instance object may implement.

In the implementation of the function instance 300 shown in FIG. 3, these methods implemented include a get unique identifier method 320 that retrieves data referenced by the unique identification field 310, a get resource metadata method 322 that retrieves data referenced by the resource metadata field 312, and a function instance activate method 324 that activates the function instance.

It should be understood that, in some implementations, the information returned by the methods 320-324 may be made available directly by means, such as and without limitation, public object properties. In such implementations, the corresponding method may not be necessary. For example, if the unique identification field 310 can be retrieved by accessing the field directly, then the get unique identifier method 320 would not be necessary. Additionally, the methods may be made available directly and without the use of an interface.

The unique identification field 310 contains data that, in some implementations, uniquely identifies the function instance in a system on which the function discovery module 212 is executing. Furthermore, the unique identification field remains constant even when the function discovery module 212 or system 200 is stopped and restarted. Therefore, once an application 210 retrieves the unique identification value for a particular function instance 300, the value can be stored and later used to locate that function instance, and thereby, a particular resource.

The resource metadata field 312 contains data specific to the particular resource 218 represented by the function instance. In one implementation, the metadata may comprise a key/value table 340. In this table, the keys 342 contain identifiers that identify the information in a particular key/value pair. For example, and without limitation, there may be a "Friendly Name" key 346 or a "Manufacturer" key 348. The value 344 associated with a particular key contains the information described by the key. For example, and without limitation, the value associated with the "Friendly Name" key 346 could be "Primary sound card," while the value associated with the "Manufacturer" key 348 could be "Company Name, Inc."

Regardless of the way in which the resource refers to a particular piece of metadata, in some implementations, the resource metadata field 312 identifies the metadata in a consistent manner through the use of standard keys 342. For example, a particular resource 218 may make its friendly name accessible using a resource-specific property called "Name," while another resource 218 may make its friendly name accessible using a method called "GetMyCommonName." In both cases, the resulting metadata could be represented in the function instance resource metadata using the same key, for example and without limitation, using a "Friendly Name" key 346.

It should be noted that the metadata represented by the key/value table 340 is not limited in any way to particular data. Furthermore, the key/value table 340 can be implemented using many data structures. Finally, the key/value table 340 does not necessarily comprise the entirety of the resource metadata accessible using the function instance.

When called, the get resource metadata method 322 returns the data represented by the resource metadata field 312. As discussed previously, this method may not be necessary or required if the resource metadata is available through other means, such as through the use of a public property.

The activation data field 314 includes or references information that may, in some implementations, be used by the function instance 300 when an application 210 requests activation of the function instance. In one implementation, the activation data field 314 may include or reference function instance provider 351 data that identifies the provider of the function instance. In the same or other implementations, the activation data field 314 may include or reference an activation data table 350 that contains references to application programming interfaces, or interfaces, that can be requested by an application 210, and references to corresponding factories that can create entities that implement the requested interface. In one implementation, references to the interfaces are stored in an interface column 352 and references to the factories are stored in a factory column 354. When an application 210 requests activation from a function instance, it submits with the request an interface that the entity returned by the function instance may support.

In one implementation, including an implementation that does or does not include an activation data table 350, the function instance provider 351 data may be used to identify the provider of the function instance. In some implementations, the provider may be queried to determine if it supports activating the interface requested by the application and may be relied upon to create an instance of an entity that supports the requested interface.

In the same or another implementation, the activation data table 350 included in or referenced by the activation data field 314 may be examined for an entry that contains the requested interface. If the interface exists, the corresponding factory may be used to create an entity that supports the requested interface. This entity is then returned to the application 210 that requested the activation. For example, an application may request an activation and specify the Foo interface 356. If the Foo interface 356 exists in the activation data table 350, the corresponding Foo factory 358 is used to create an entity that implements the Foo interface.

In the same or another implementation, the requesting application may supply or reference with the request a factory that may be able to activate the requested interface. In such an implementation, the function instance provider 351 data and activation data table 350 may or may not be necessary for the purposes of activating the function instance.

It should be understood that while the terms "interface" and "factory" are often associated with object-oriented environments, the functionality enabled by the activation data field 314 is not limited to any particular environment or system and can also be implemented in non-object-oriented systems. Furthermore, the activation data table 350 can be implemented using many data structures. Finally, the function instance provider 351 data and activation data table 350 do not necessarily comprise the entirety of the activation data used or maintained by the function instance 300.

In some implementations, the function instance activate method 324 uses activation data associated with the function instance or provided in the activate request to activate the function instance, ultimately returning an entity that supports the requested interface. As was explained previously, an implementation of the activate method 324 may use function instance provider data 351 to identify a provider which may then activate the function instance, it may use interface and factory data in an activation data table 350 to identify a factory which may then activate the function instance, it may use a factory included or referenced in the activate call, or it may activate the function instance through other means. Also as discussed previously, this method may not be necessary or required if the activation data included in or referenced by the activation data field 314 is available through other means, such as through the use of a public property.

Turning now to FIG. 4, shown therein is a generalized representation of an API layer 400. In some implementations, an API layer may be a data structure embodied in a computer-readable media or medium. The following description of FIG. 4 is made with reference to the system 200 of FIG. 2, the function instance 300 and the activation data table 350 of FIG. 2, and the tree structure 500 of FIG. 5. However, it should be understood that the API layer 400 described with respect to FIG. 4 is not intended to be limited to being used by or interacting with elements of the system 200, the function instance 300 and the activation data table 350, or the tree structure 500.

In accordance with some implementations, the mapped function instance provider 230 uses some number of API layers 400 and a tree structure, such as the tree structure 500, to enable enhanced categorization and activation of function instances. An API layer 400 represents the information that may be used by the mapped function instance provider 230 to retrieve function instances in a particular category and also to enable activation of the retrieved function instances. Some implementations may not support all functionality or include all data identified by the exemplary API layer 400. For example, and without limitation, one implementation may include only information necessary for enhanced categorization of function instances and may not include information necessary for activation of function instances. In such an implementation, activation may be supported through other data and means outside of the API layer 400. Finally, in one implementation, the API layers 400 and tree structure 500 are stored in the mapped function instance provider data 232.

The API layer 400 illustrated in FIG. 4 includes a category of underlying function instance(s) field 412, a subcategory of underlying function instance(s) field 414, a filter criteria field 416, a supported interface field 418, and a factory field 420.

If present in the API layer, the category and subcategory of underlying function instance(s) fields 412 and 414 may represent the category from which the function instances returned by this API layer 400 originate. The mapped function instance provider might not create any function instances that directly reference a resource 218. Instead, the mapped function instance provider 230 may create function instances that map to other function instances, including function instances created by a provider 214, or function instances created by the mapped function instance provider 230.

The category and subcategory of underlying function instance(s) fields 412 and 414 specify the base set of function instances returned using the API layer 400, before any filtering performed using the filter criteria field 416. For example, and without limitation, an API layer 400 called "Audio Endpoints Local" might contain the necessary category and subcategory to specify a set of function instances that directly map to sound hardware on the local computer system.

If present in the API layer, the filter criteria field 416 may contain or reference data by which the set of function instances returned using the API layer 400 is filtered. For a function instance to be specified by an API layer 400, it may be identified by the category and subcategory of underlying function instance(s) fields 412 and 414, and may also meet the filter criteria specified in this field, if any filter criteria information is provided.

Filter criteria can include, for example and without limitation, particular values of resource metadata properties as well as supported application programming interfaces. For example, filter criteria for audio hardware might indicate that a resource metadata property named "Device Type" has the value "Audio Hardware" and that the function instance supports the "Audio" application programming interface.

If present in the API layer, the supported interface field 418 may contain the application programming interface supported by the function instances returned using this API layer 400. Alternatively, the supported interface field 418 may contain no supported application programming interface, in which case the API layer does not in and of itself support activation, although activation may still be supported through other data or means.

In some implementations, the data in or referenced by the supported interface field 418 populates a portion of the interface column 352 of the activation data table 350 referenced by a function instance 300. In these cases, because the data exists in or is referenced by the interface column 352, during activation, in some implementations the data originating in the supported interface field 418 is used as part of the process that determines if the function instance supports a requested interface.

If present in the API layer, the factory field 420 may identify a factory entity that creates entities that support the interface specified in the supported interface field 418. Alternatively, if no such factory exists, the factory field 420 may not identify a factory. As with the data in or referenced by the supported interface field 418, in some implementations, the data in or referenced by the factory field 420 populates a portion of the activation data table 350 referenced by a function instance 300.

In some implementations, the data in or referenced by the factory field 420 populates a portion of the factory column 354 of the activation data table 350. Because the data exists in or is referenced by the factory column 354, during activation, the data originating in the factory field 420 is used as part of the process that determines the factory entity that can create an entity that supports the requested interface.

Figure 5:
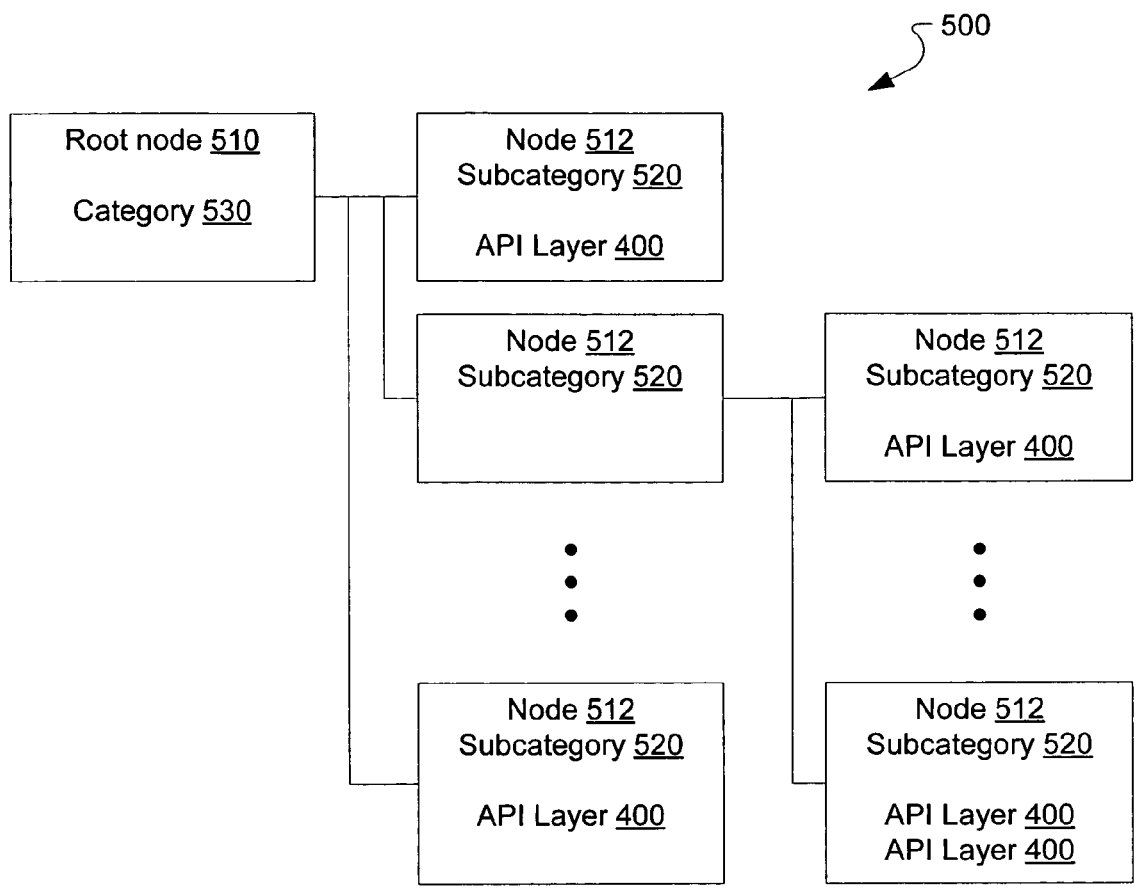
FIG. 5 illustrates a generalized representation of a tree structure that may be used by a mapped function instance provider.

Turning now to FIG. 5, shown therein is a generalized representation of a tree structure 500 which specifies categories and subcategories used by the mapped function instance provider 230. The following description of FIG. 5 is made with reference to the system 200 of FIG. 2, the function instance 300 and the activation data table 350 of FIG. 3, and the API layer 400 of FIG. 4. However, it should be understood that the tree structure described with respect to FIG. 5 is not intended to be limited to being used by or interacting with the system 200, the function instance 300 and the activation data table 350, or the API layer 400.

The tree structure 500 represents a conceptual model of the category and subcategory relationships that can be used by the mapped function instance provider 230. The tree structure 500 includes a root category 530, associated with the mapped function instance provider, and some number of subcategories 520.

The subcategories may be organized in a hierarchical manner as is shown in the diagram, but are not limited to this structure and may be organized in any other structure, including, but not limited to, a flat list. If the subcategories are organized in a hierarchical manner, a single subcategory may commonly be referred to using a notation such as, but not limited to, the following: "Subcategory A/Subcategory B/Subcategory C." This notation would locate subcategory C as a descendant of subcategory B, which is in turn is a descendant of subcategory A.

When an application 210 requests function instances from the discovery interface module 226 and specifies the mapped function instance provider 230, the mapped function instance provider 230 uses any provided subcategory information to locate the specified node 512 in the tree structure 500. Once the specified node 512 has been located, the function instance provider uses any API layers 400 associated with that node to generate function instances 300.

A node 512 may have zero or more API layers 400. If no API layers 400 exist for a given node, then, in some implementations, no function instances are returned when that node 512 is specified in a request for function instances. A node 512 may have multiple API layers 400. If multiple API layers 400 are specified, then in some implementations, the set of function instances returned consists of function instances from all specified API layers.

An application 210 may request that function instances 300 should be returned from the node 512 specified by the subcategory information, as well as all nodes descended from the specified node. In this case, the API layers 400 in the specified node 512 and all descendant nodes 512 are used to create function instances.

Figure 6:
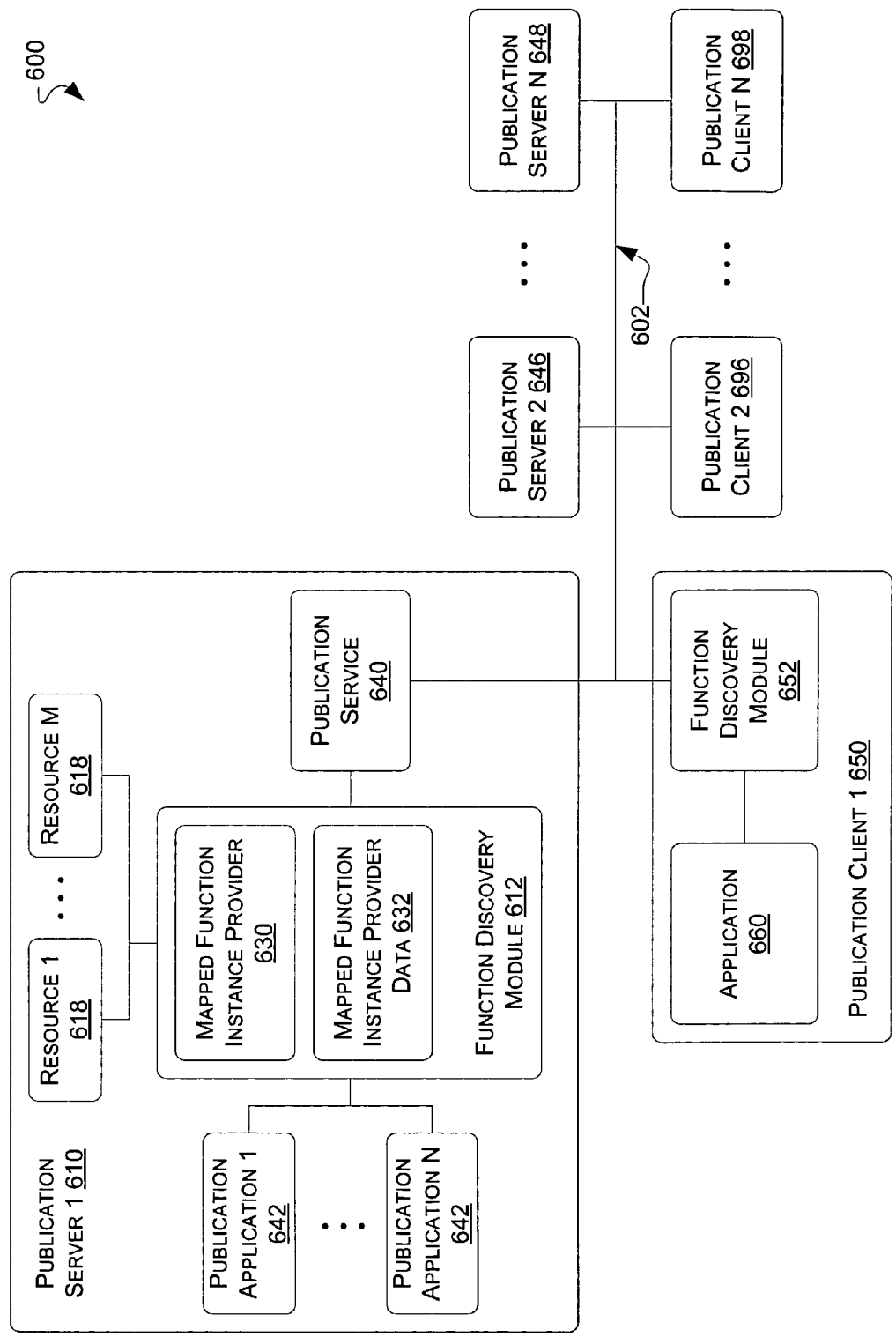
FIG. 6 illustrates one implementation of a system in which publication and subscription, as described herein, can be carried out.

Turning now to FIG. 6, illustrated therein is a system 600 in which publication of and subscription to function instances 300 can be carried out. Included in the system are a number of publication servers 610, 646, and 648, a number of publication clients 650, 696, and 698, and a communications medium 602. The following description of FIG. 6 is made with reference to the system 200 of FIG. 2 and the function instance 300 of FIG. 3. However, it should be understood that the system described with respect to FIG. 6 is not intended to be limited to being used by, or interacting with, elements of the system 200 or the function instance 300.

Generally, a publication server 610 may be any system that is operable to publish the data associated with function instances 300, said data to be used by one or more publication clients 650. In general, a publication client 650 may be any system that is operable to use data published by one or more publication servers 610. As defined herein, the term "publish" refers to making some or all of the data associated with a function instance available. Similarly, the phrase "publishing a function instance" refers to making some or all of the data associated with the function instance available.

In accordance with one implementation, the publication servers 610, 646, and 648 are linked to each other and to the publication clients 650, 696, and 698 by a communications medium 602 that functions to enable the publication servers and publication clients to communicate. For example, and without limitation, the communications medium 602 may be a wired network or a wireless network, or a combination of wired and wireless networks. Furthermore, one or more publication servers and one or more publication clients can reside on the same physical computer, in which case the communications medium 602 may also include one or more forms of intra-computer communication channels, such as inter-process calls or messages.

Included in the publication server 610 are a function discovery module 612, a publication service 640, a number of resources 618, and a number of publication applications 642.

In general, the publication service 640 is a program, process, or the like, that publishes some or all of the information associated with certain resources to publication clients 650. In some implementations, the publication service uses the function discovery module 612 to obtain function instances that represent resources, from which it obtains data to publish to publication clients. The publication service may also provide notifications to publication clients when the function instances it has published change. It may also notify clients when new function instances are available, or when published function are no longer usable or accessible, or should no longer be published. Also, in some implementations, the publication service responds to requests from publication clients for information about the function instances it has published.

For example, and without limitation, in accordance with one implementation, when the publication service 640 starts, perhaps, and without limitation, because the computer on which it is installed has started, it queries the function discovery module 612 and obtains the set of function instances 300 that should be published. The publication service may then send a publish message for each function instance using a network or other communication protocol or service like, for example, and without limitation, the Web Service Discovery protocol. In another implementation, the publication service may send a single publish message with information about all of the function instances. In another implementation, the publication service may send more than one publish message, but fewer publish messages than the number of function instances. The publication service may then monitor or receive notifications about the set of function instances it has published, and notify publication clients when a function instance changes, possibly by sending a new publish message with updated data associated with the changed function instances. The publication service may also send new publish messages when new function instances are available, and may send unpublish messages when function instances should no longer be published. When the publication service stops executing, perhaps, and without limitation, because the computer on which it is installed is shutting down, it may send an unpublish messages for each function instance it is currently publishing, to notify publication clients that the associated resource is no longer available through that particular publication service. In another implementation, the publication service may send a single or some other number of unpublish messages for the function instances that are currently published.

In general, the function discovery module 612 is similar or identical to the function discovery module 212 of FIG. 2. In other implementations, it may not be similar or identical. The mapped function instance provider 630 and mapped function instance provider data 632 may be, in accordance with one implementation, used by a publication server to assist in identifying the function instances to be published.

The mapped function instance provider 630 and mapped function instance provider data 632 may be similar or identical to the mapped function instance provider 230 and mapped function instance provider data 232 of FIG. 2. In other implementations, they may not be similar or identical. In accordance with one implementation, the mapped function instance provider data 632 may store information about the function instances 300 to publish. The mapped function instance provider 630, when queried for the set of function instances to publish, obtains information from the mapped function instance provider data 632. As is the case with other mapped function instances, which reference other function instances, the function discovery module 612 then queries for additional function instances that, ultimately, represent actual resources.

In general, the resources 618 are similar or identical to the resources 218 of FIG. 2. In other implementations, they may not be similar or identical.

In general, a publication application 642 is any program, process, or the like, that wants to publish resources 618 using the publication service 640. In some implementations, the publication application may indicate that resources should be published by interacting with the function discovery module 612. Any given publication server may have one or more publication applications.

For example, and without limitation, in accordance with one implementation, the publication application 642 may use an API provided by the function discovery module 612 to specify the function instances 300 to be published. The function discovery module then uses these function instances when it is queried by the publication service 640 to determine the function instances to publish. In accordance with one implementation, the publication server may use the mapped function instance provider 630 and mapped function instance provider data 632 to maintain the set of function instances to publish. In this implementation, the publication application 642 may add or remove from the set of function instances to publish by creating or deleting mapped function instances, by interacting with the function discovery module using a function discovery module API, or by modifying the mapped function instance provider data 632 directly.

Included in the publication client 650 are an application 660 and a function discovery module 652.

In general, the application 660 is a program, process, or the like that is operable to interact with or control the function discovery module 652 and/or one or more of the resources made accessible through the function discovery module using function instances 300, including resources 618 published by a publication server 610.

In accordance with one implementation, the application 660 may be a program that displays a graphical representation of available resources. However, those skilled in the art will appreciate that the application can be any process that is operable to communicate with or make use of any resources, for any purpose.

In general, the function discovery module 652 is similar or identical to the function discovery module 212 of FIG. 2. In other implementations, it may not be similar or identical. As defined herein, the function discovery module 652 is operable to obtain information from one or more publication services 640, which it then uses to create function instances 300. The function discovery module 652 is also described in additional detail below, with reference to FIG. 7.

Figure 7:
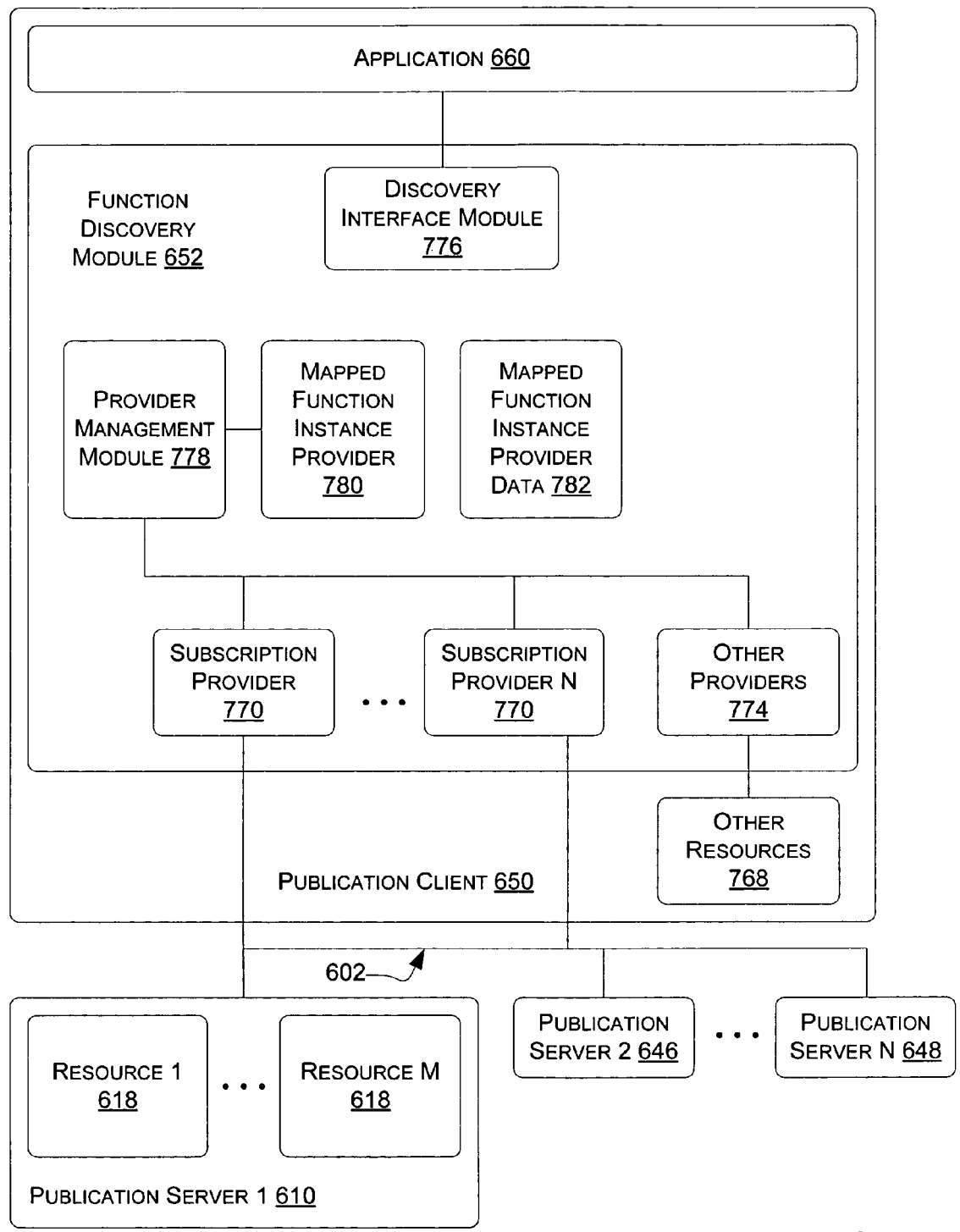
FIG. 7 illustrates one implementation of a system that receives function instances published by publication servers.

Turning now to FIG. 7, illustrated therein is one implementation of a system that receives function instances 300 published by publication servers. Included in the system are a publication client 650 and a number of publication servers 610, 646, and 648. The following description of FIG. 7 is made with reference to the system 200 of FIG. 2, the function instance 300 of FIG. 3, and the system 600 of FIG. 6. However, it should be understood that the system described with respect to FIG. 7 is not intended to be limited to being used by, or interacting with, elements of the system 200, the function instance 300, or the system 600.

As explained previously with reference to FIG. 6, the publication client 650 is linked to one or more publication servers 610, 646, and 648 by a communications medium 602.

Also as explained previously with reference to FIG. 6, the publication servers 610, 646, and 648 publish data associated with selected function instances that are accessible from the publication server.

Included in the publication client 650 are a function discovery module 652, an application 660, and other resources 768.

As explained previously with reference to FIG. 6, the application 660 is any program, process, or the like, that is operable to interact with or control the function discovery module 652 and/or one or more of the resources made accessible through the function discovery module using function instances 300, including resources 618 published by a publication server 610 and other resources 768 on the same computer system.

Included in the function discovery module 652 are a discovery interface module 776, a provider management module 778, one or more subscription providers 770, and other providers 774. Also included in the function discovery module 652 is mapped function instance provider data 782.

In general, the discovery interface module 776 is a programmatic entity that provides functionality to receive requests from an application 660 and also includes various routines operable to handle the requests. In some implementations the discovery interface module 776 may be similar or identical to the discovery interface module 226 of FIG. 2. In other implementations, it may not be similar or identical.

In general, the provider management module 778 is a programmatic entity that accepts requests for function instances 300 from the discovery interface module 776 and, in some implementations, uses providers 770 and 774 to retrieve function instances, which it then returns to the discovery interface module 776. In some implementations, the provider management module 778 may be similar or identical to the provider management module 228 of FIG. 2. In other implementations, it may not be similar or identical.

In general, the mapped function instance provider 780 is a particular implementation of a provider that supports the creation of mapped function instances, using, in accordance with one implementation, the mapped function instance provider data 782. In some implementations, the mapped function instance provider 780 and mapped function instance provider data 782 may be similar or identical to the mapped function instance provider 230 and mapped function instance provider data 232 of FIG. 2. In other implementations, they may not be similar or identical.

In general, the one or more subscription providers 770 are programmatic entities that receive requests for function instances 300 from the provider management module 778. In response to a request from the provider management module, a subscription provider uses data obtained from one or more publication servers to create and return function instances that satisfy the provider management module's request.

The particular manner in which a subscription provider 770 obtains data about resources and creates function instances 300 may be dependent on the type of resources with which it is associated as well as the nature of the communication with the publication servers from which it obtains resource information. In accordance with one implementation, a subscription provider may obtain data about resources by querying publication servers for function instances by unicasting, multicasting, or broadcasting requests for resources by resource name, resource type, or any other criteria that serves to categorize resources. In another or the same implementation, a subscription, provider may obtain resource information by receiving and storing communications that contain resource information initiated by publication servers. In accordance with one implementation, the subscription provider may notify the function discovery module when the data associated with function instances it has provided changes. It may obtain knowledge of changes to this data by querying publication servers, by receiving notifications of changes from publication servers, or by some other means. A subscription provider that receives data about resources published by a publication server may also receive data about resources made available by computers or software processes that are not publication servers.

For example, in one implementation, and without limitation, a subscription provider 770 uses the Devices Profile for Web Services specification or the Web Service Discovery protocol to interact with publication servers and, in some implementations, with computers or software processes that are not publication servers. Such a subscription provider may obtain data with which it creates function instances 300 by sending a PROBE message, with a particular resource type or name, and receiving responses from publication servers or other computers or software processes that understand the Devices Profile for Web Services specification or the Web Service Discovery protocol. It may also obtain resource data with which it creates function instances by receiving HELLO messages sent by publication servers or other computers or software processes announcing new resources. The subscription provider of this example may receive information about changes to resources by querying the publication server or other computers or software processes using PROBE messages. It may also receive information about changes to resources by receiving notifications initiated by the publication servers or other computers or software processes using HELLO messages.

In general, the other providers 774 are programmatic entities that receive requests for function instances 300 from the provider management module and, in response to these requests, provide function instances associated with other resources 768. In some implementations, the other providers 774 and other resources 768 may be similar or identical to the providers 214 and resources 218 of FIG. 2. In other implementations, they may not be similar or identical.

Figure 8:
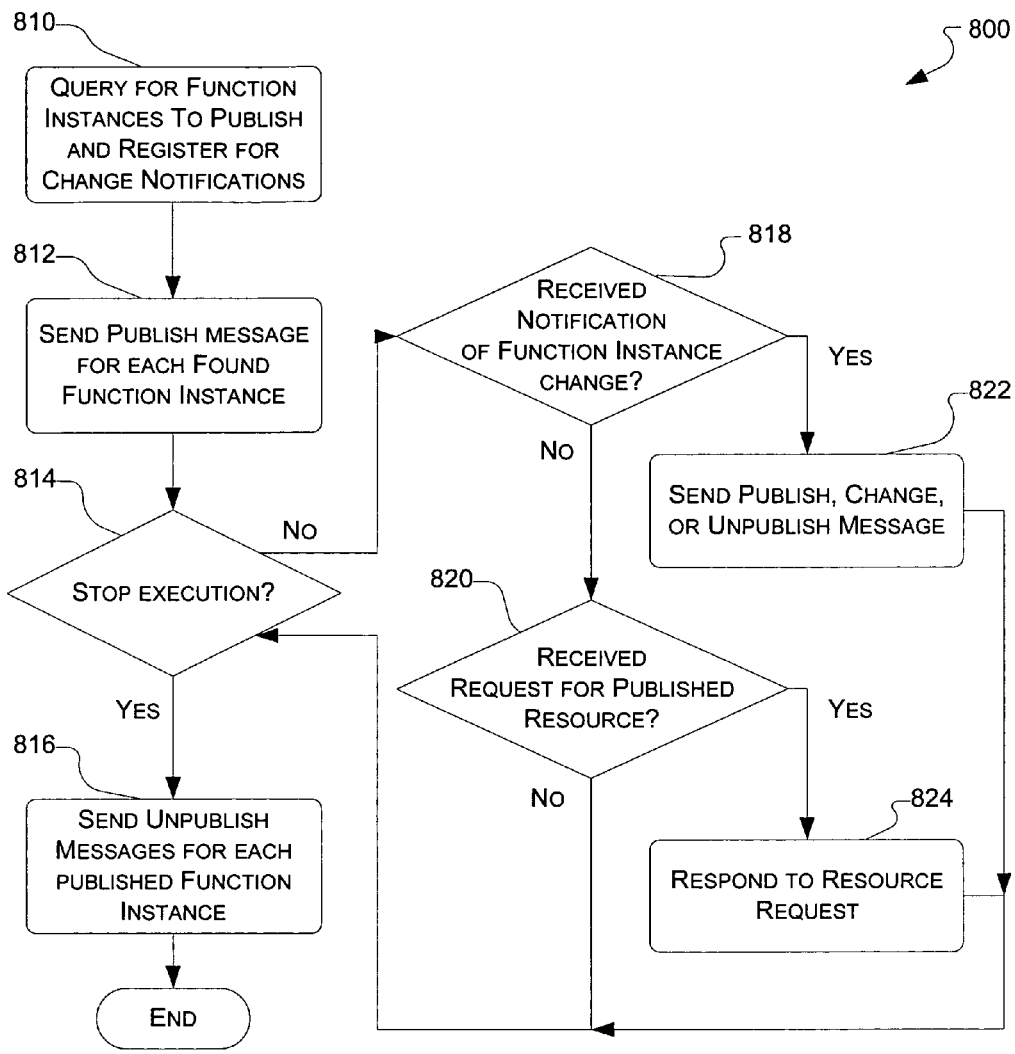
FIG. 8 illustrates a generalized operational flow including various operations that may be performed in publishing function instances.

Turning now to FIG. 8, shown therein is generalized operational flow including various operations that may be performed in publishing function instances 300. The following description of FIG. 8 is made with reference to the function instance 300 of FIG. 3 and the system 600 of FIG. 6. However, it should be understood that the operational flow described with respect to FIG. 8 is not intended to be limited to being performed by the function instance 300 or the system 600. Additionally, it should be understood that while the operational flow 800 indicates a particular order of operation execution, in other implementations the operations may be ordered differently.

As shown, in one implementation of operation 810 the publication service 640 of the publication server 610 queries the function discovery module 612 for a set of function instances 300 to publish. In accordance with the same or another implementation, it may also register with the function discovery module 612 to receive notifications when the function instances for which it queries change.

In accordance with one implementation, and without limitation, the publication service 640 may query for function instances 300 to publish by providing category, subcategory, and other criteria information that results in the function discovery module 612 using the mapped function instance provider 630 to obtain function instances. In such an implementation, the publication application 642 may indicate which function instances are to be published by creating function instances in a category monitored by the publication service.

After receiving the set of function instances 300 to be published, in one implementation of operation 812, the publication service 640 sends a publish message for each function instance. This publish message may include, but is not limited to, the network location of the resource and other information about the resource represented by the function instance. For example, and without limitation, when the publication service uses the Devices Profile for Web Services specification and the Web Service Discovery protocol, the publish message may correspond to a Web Service Discovery HELLO message. In another implementation of operation 812, the publication service may send a single publish message for all function instances. In yet another implementation of operation 812, the publication service may send more than one publish message associated with the function instances.

In one implementation of operation 814, the publication service 640 determines if it should stop execution. In accordance with one implementation, and without limitation, when the publication service runs as an operating system service, the publication service may start execution when the computer starts or stop execution when the computer stops. In other implementations, the publication service may start and stop based on user requests or on other criteria or configuration data. In yet other implementations, the publication service may exist as part of or be hosted by an application whose lifetime may be controlled by the user, or by other criteria or configuration data.

If it is determined in operation 814 that publication service 640 should stop execution, the operational flow 800 continues to operation 816. If it is determined that the publication service should not stop execution, the operational flow continues to operation 818, described below.

When it has been determined that the publication service should stop execution, the operational flow proceeds to operation 816. In one implementation of operation 816, the publication service sends an unpublish message for each function instance it has previously published and for which it has not previously sent an unpublish message. For example, and without limitation, when the publication service uses the Devices Profile for Web Services specification or the Web Service Discovery protocol, the unpublish message may correspond to a Web Service Discovery BYE message. In another implementation of operation 816, the publication service sends a single unpublish message for all function instances. In yet another implementation of operation 816, the publication service sends more than one unpublish messages associated with the function instances.

When it has been determined that the publication service should not stop execution, the operational flow proceeds to operation 818. In one implementation of operation 818, the publication service 640 determines if it has received a notification from the function discovery module 612 of a change to one of the function instances 300 it has previously received from the function discovery module. It also determines if it has received notifications from the function discovery module of new function instances to publish, possibly because there are new function instances that satisfy the criteria specified in operation 810, or that function instances previously supplied by the function discovery module should no longer be published, possibly because they are no longer usable or accessible.

If it is determined in operation 818 that there are new, removed, or changed function instances 300, the operational flow 800 continues to operation 822. If it is determined that there are no new, removed, or changed function instances, the operational flow continues to operation 820, described below.

When it has been determined that there are new, removed, or changed function instances 300, the operational flow 800 proceeds to operation 822. In one implementation of operation 822, the publication service 640 sends a publish, unpublish, or change message, depending on whether there are new, removed, or changed function instances. The nature of operation 822 is described in more detail below, with reference to FIG. 9 and operational flow 900.

If it is determined in operation 818 that there are no new, removed, or changed function instances 300, the operational flow 800 proceeds to operation 820. In one implementation of operation 820, the publication service determines if it has received a request from a publication client 650 for a published resource or resources.

If it is determined in operation 820 that the publication service 640 has received a request for a published resource from a publication client 650, the operational flow 800 continues to operation 824, where a response is sent to the publication client. If it is determined that the publication service has not received a request for a published resource, the operational flow 800 proceeds to operation 814, described previously. In accordance with one implementation, if the publication service receives a request for a resource that it cannot satisfy using any of the resources it has previously published, no response is sent to the publication client. However, it will be appreciated by those skilled in the art that in some implementations the publication service may send a response that indicates explicitly that no resources satisfy the request from the publication client.

When it has been determined that the publication service 640 has received a request for a resource it has previously published, the operational flow proceeds to operation 824. In one implementation of operation 824, the publication service responds to the request with information about the previously published resource or resources that satisfy the request from the publication client 650. This information may include, but is not limited to, the network location of the resource(s) that satisfy the publication client's request. For example, and without limitation, in one implementation, the request from the publication client may consist of a Web Service Discovery PROBE message. In this example, the response from the publication service may consist of a Web Service Discovery PROBE MATCH message.

It will be appreciated by those skilled in the art that the publication service may only determine if it publishes resources that satisfy a publication client's request in response to an actual request from a publication client, instead of determining which resources it publishes before a request. In this case, the publication service may respond to a request from a publication client before or instead of sending a notification of published resource. It will also be appreciated that one implementation of this operational flow may use separate operating system or process threads to check for notifications or events. For example, and without limitation, a thread may exist to receive notifications of changes to function instances, another thread may exist to receive requests for published resources, and another thread may exist to determine if the operational flow should stop execution.

Figure 9:
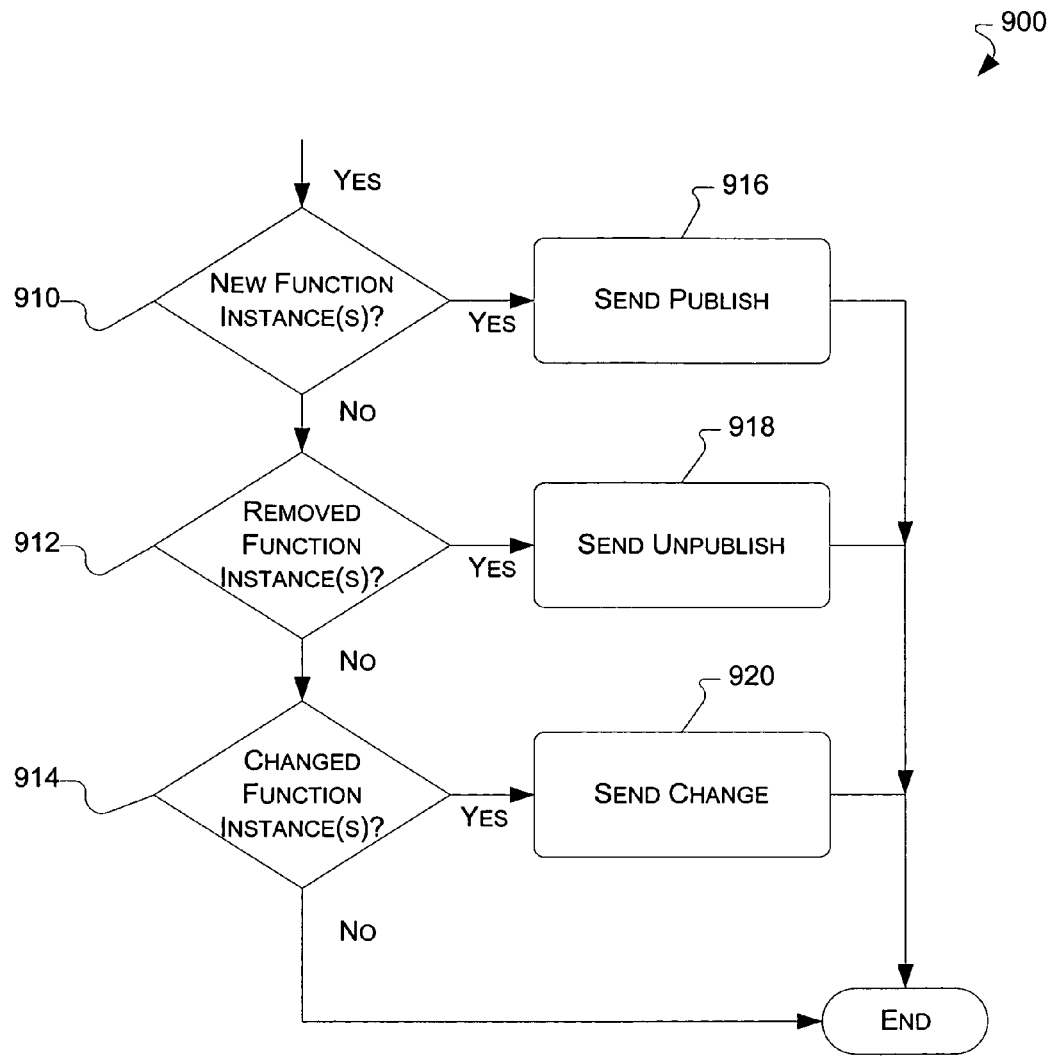
FIG. 9 illustrates a generalized operational flow including various operations that may be performed in responding to a change in published function instances.

Turning now to FIG. 9, shown therein is a generalized operational flow including various operations that may be performed in responding to a change in published function instances 300. In particular, the operational flow 900 illustrates operations that might be performed by a publication service 640 to carry out the sending operation 822 of operational flow 800. In one implementation, the sending operation 822 is performed when the publication service determines that it has received a notification from the function discovery module 612 of a change to one of the function instances it has previously received from the function discovery module. Operation 822 may also be performed when the publication service determines it has received notifications from the function discovery module either of new function instances to be published, or that function instances previously supplied by the function instance should no longer be published, possibly because they are no longer usable or accessible.

The following description of FIG. 9 is made with reference to the function instance 300 of FIG. 3 and the system 600 of FIG. 6. However, it should be understood that the operational flow described with respect to FIG. 9 is not intended to be limited to being performed by the function instance 300 or the system 600. Additionally, it should be understood that while the operational flow 900 indicates a particular order of operation execution, in other implementations the operations may be ordered differently.

As shown, in one implementation of operation 910, the publication service determines if the function discovery module 612 has provided notification of new function instances 300 that should be published, possibly, for example and without limitation, because the function discovery module knows of new function instances that satisfy the criteria specified in operation 810 of FIG. 8.

If it is determined in operation 910 that the change is due to new function instances 300 to be published, the operational flow 900 proceeds to operation 916. If the change is not due to new function instances, the operational flow continues to operation 912, described below.

When it has been determined that the change is due to new function instances 300 to be published, the operational flow 900 proceeds to operation 916. In one implementation of operation 916, the publication service sends a publish message that may be received by one or more publication clients 650. In accordance with one implementation, and without limitation, when the publication service uses the Devices Profile for Web Services specification or the Web Service Discovery protocol, the publish message may correspond to a Web Service Discovery HELLO message. In some implementations, a new HELLO message may be sent for each new function instance. In other implementations, when a new function instance is to be published and other function instances have already been published, a HELLO message may be sent with an updated metadata version.

When it has been determined that the change is not due to new function instances 300 to be published, the operational flow 900 proceeds to operation 912, where the publication service determines if the function discovery module 612 has provided notification that previously supplied function instances are no longer usable or accessible, or for any reason should no longer be used.

If it is determined in operation 912 that the change is due to function instances 300 that should no longer be published, the operational flow 900 proceeds to operation 918. If the change is not due to function instances that should no longer be published, the operational flow continues to operation 914, described below.

When it has been determined that the change is due to function instances 300 that should no longer be published, the operational flow proceeds to operation 918. In one implementation of operation 918, the publication service sends an unpublish message that may be received by one or more publication clients 650. In accordance with one implementation, and without limitation, when the publication service uses the Devices Profile for Web Services specification or the Web Service Discovery protocol, the unpublish message may correspond to a Web Service Discovery BYE message. In another implementation, the unpublish message may correspond to a HELLO message with an updated metadata version that reflects the change in published function instances.

When it has been determined that the change is not due to function instances 300 that should no longer published, the operational flow 900 proceeds to operation 914, where the publication service determines if the function discovery module 612 has provided notification that previously supplied function instances have changed. For example, and without limitation, a notification may be raised when a property value associated with a previously supplied function instance has a new value.

If it is determined in operation 914 that the change is due to a change in a previously supplied function instances 300, the operational flow 900 proceeds to operation 920. If the change is not due to a change in a previously supplied function instance, the operational flow ends. In the specific implementation described in operational flow 900, operation 914 should always proceed to operation 920, because all other criteria that caused operational flow 900 to execute have been checked and exhausted.

When it has been determined that the change is due to a change in a previously supplied function instances 300, the operational flow proceeds to operation 920. In one implementation of operation 920, the publication service sends a change message that may be received by one or more publication clients 650. In accordance with one implementation, and without limitation, when the publication service uses the Devices Profile for Web Services specification or the Web Service Discovery protocol, the update message may correspond to a Web Service Discovery HELLO message with new data, for example and without limitation, an updated metadata version, that reflects, for example and without limitation, a changed function instance, a change in a function instance, or a change in published function instances. In other implementations, the change message may correspond to a message type dedicated to communicating changes rather than to a message type, like the HELLO message, that also communicates the existence of new resources.

Figure 10:
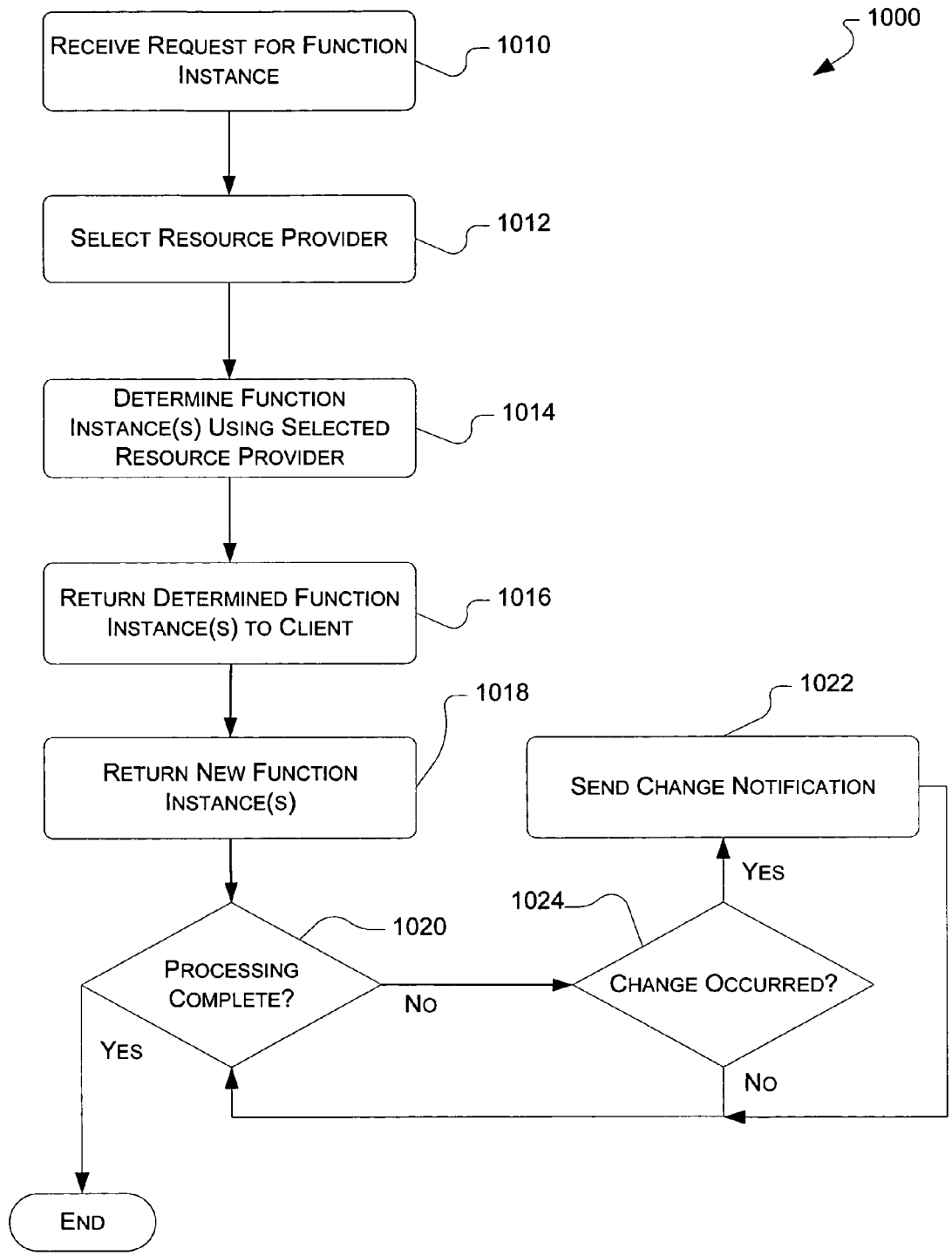
FIG. 10 illustrates a generalized operational flow including various operations that may be performed in retrieving function instances.

Turning now to FIG. 10, shown therein is a generalized operational flow 1000 including various operations that may be performed in a process that retrieves function instances 300. The following description of FIG. 10 is made with reference to the system 200 of FIG. 2, the function instance 300 of FIG. 3, the API layer 400 of FIG. 4, and the tree structure 500 of FIG. 5. In particular, the description of FIG. 10 is made with reference to the function discovery module 212, the provider management module 228, a provider 214, and the function instance 300. However, it should be understood that the operational flow described with respect to FIG. 10 is not intended to be limited to being performed by the function discovery module 212, the provider management module 228, a provider 214, or the function instance 300, or to be limited to being associated with the system 200 of FIG. 2, the function instance 300 of FIG. 3, the API layer 400 of FIG. 4, or the tree structure 500 of FIG. 5. Additionally, it should be understood that while the operational flow 1000 indicates a particular order of operation execution, in other implementations the operations may be ordered differently.

As shown, in one implementation of operation 1010 the discovery interface module 226 of function discovery module 212 receives a request for a set of function instances 300. This request may include, but is not limited to, a category; a subcategory; a tree enumeration flag that defines if only the subcategory identified by the category and subcategory information should be searched, or if all descendant subcategories should also be searched; filter criteria that specifies how the returned function instances should be filtered; and whether the requestor should be notified of changes to the function instances after the function instances are returned.

In some implementations, the function discovery module 212 dispatches the request to the provider management module 228. In one implementation of operation 1012, the provider management module 228 uses the specified category to identify a provider 214 to service the request for function instances 300.

The provider management data 234 may contain information that maps categories to providers 214. A provider 214 generally corresponds to a particular type of resource. For example, and without limitation, a single provider may correspond to any of the following types of resources: Plug and Play resources, Universal Plug and Play resources, Web Service Discovery resources, Simple Service Discovery Protocol resources, and software components. Providers may also correspond to any other type of resource. A provider may correspond to resources on the same computer system on which the provider is executing, or to resources on other computer systems.

In one implementation of operation 1014, the provider 214 selected in operation 1012 creates and returns function instances 300 identified in the request. The steps taken by the provider 214 to obtain the information necessary for it to create function instances vary by provider. For example, a provider 214 for Plug and Play resources may use an application programming interface specific to interaction with Plug and Play resources to enumerate the resources and retrieve resource metadata information about the resources.

In the case of Plug and Play resources, this application programming interface may be the SetupDi application programming interface. SetupDi is an API included with certain versions of the Windows® operating system, from Microsoft Corporation of Redmond, Wash. The SetupDi API enables accessing Plug and Play hardware. In some implementations, the mapped function instance provider 230 may use tree structure 500 and API layer 400 data stored in the mapped function instance provider data 232 to create function instances.

In operation 1018, in some implementations, the function instances 300 created by the provider are returned to the provider management module 228, then to the function discovery module 212, then to the discovery interface module 226, and finally to the application 210.

It should be noted that the provider 214 may create the function instances and return them to the provider management module 228, or it may return the data necessary to create the function instances and leave the actual creation of the function instances to the provider management module 228 or to the function discovery module 212.

It should be further noted that the provider 214 may return function instances or data asynchronously from the request for function instances. Also, the function instances 300 created by the provider 214 may not be complete—that is, they might not contain all of the information required to be contained by a function instance. In such cases, the function discovery module 212, the provider management module 228, the discovery interface module 226, or another module, may supplement the data in the created function instances 300 before the function instances are returned to the requesting application 210.

In one implementation of operation 1020, the function discovery module 212 determines if the processing necessary for this request is complete. In one implementation, the processing may be deemed complete if the requesting application 210 did not request to be notified of changes to the function instances 300 after the function instances are returned. In some implementations, in contrast, if the application did request notification of changes to the requested function instances, the function discovery module may need to respond when one of the requested function instances changes, and so processing may not be considered complete.

If it is determined in operation 1020 that processing is complete, the operational flow 1000 is finished. If it is determined in operation 1020 that processing is not complete, operational flow proceeds to operation 1024.

In one implementation of operation 1024, the function discovery module 652 determines if a change to the resources represented by the previously created function instance 300 has occurred. The manner in which it determines if a change has occurred may vary depending on both the nature of the resource and the implementation of the function discovery module. For example, some resource types may support providing asynchronous notification of changes. Knowledge of changes for other resource types may require that the function discovery module or some other module poll the resource and compare the current state of the resource with the state that existed when the original function instance was created.

If it is determined in operation 1024 that a change has occurred, the operational flow 1000 proceeds to operation 1022. If it is determined that a change has not occurred, the operational flow 1000 proceeds to operation 1020.

In general, in one implementation of operation 1022, the function discovery module sends notification of the change identified in operation 1024 to the application 210. The mechanism by which the function discovery module 212 notifies the application 210 may vary. In one implementation, the function discovery module may notify the application of the change by using an API implemented by a programmatic entity provided to the function discovery module by the application. In another implementation, the function discovery module may send operating system messages to the application. In yet another implementation, the application may call an API provided by the function discovery module to determine if changes have occurred.

In addition, those skilled in the art will realize that the data provided to the application can be determined in many ways. For example, the data may have been provided in an asynchronous callback to the function discovery module 212, it may have been the result of a call from the function discovery module to an API supported by the resource, or it may have been obtained through some other means.

Figure 11:
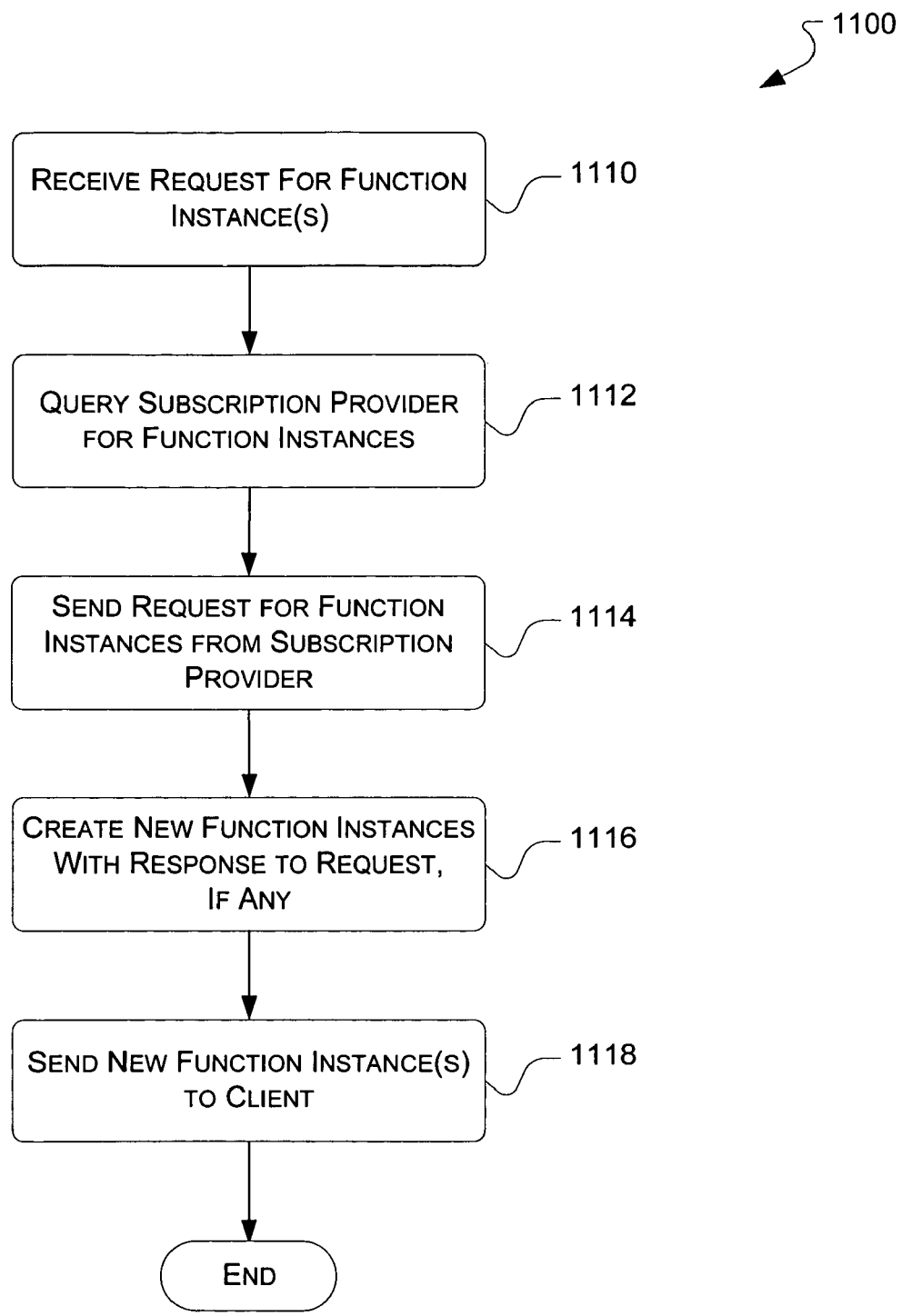
FIG. 11 illustrates a generalized operational flow including various operations that may be performed to service a request for published function instances.

Turning now to FIG. 11, shown therein is a generalized operational flow including various operations that may be performed to service a request for published function instances. The following description of FIG. 11 is made with reference to the system 200 of FIG. 2, the function instance 300 of FIG. 3, the system 600 of FIG. 6, and the system 700 of FIG. 7. However, it should be understood that the operational flow described with respect to FIG. 11 is not intended to be limited to being performed by the system 200, the function instance 300, the system 600, or the system 700. Additionally, it should be understood that while the operational flow 1100 indicates a particular order of operation execution, in other implementations the operations may be ordered differently.

As shown, in one implementation of operation 1110, the discovery interface module 776 receives a request for function instances 300 from an application 660. In some implementations, the application 660 and discovery interface module 776 are similar or identical to the application 210 and discovery interface module 226 of FIG. 2, and the nature of the request is correspondingly similar or identical. For example, and without limitation, the request may include a category, a subcategory, filter criteria, and so on. In some implementations, the application 660 and discovery interface module 776 are not similar or identical to the application 210 and discovery interface module 226.

In accordance with one implementation, the request received in operation 1110 may directly or indirectly result in use of a subscription provider 770. In such cases, operational flow continues to operation 1112, where, in one implementation, the provider management module 778 queries the subscription provider for function instances that satisfy the request, passing any required criteria information to the subscription provider.

In general, in operation 1114 the subscription provider sends requests to publication servers for resources that satisfy the provided criteria. In accordance with one implementation, and without limitation, the request may correspond to a Web Service Discovery PROBE message.

It will be appreciated by those skilled in the art that the subscription provider 770 does not necessarily need to send requests for further resource information if it already stores information sufficient to satisfy the request from the provider management module 778. For example, and without limitation, the subscription provider may cache the results of previous queries and use the cached data to service requests it receives. In the same or another implementation, and again without limitation, the subscription provider may cache information that was broadcast unsolicited by publication servers, and may use this information likewise to service requests it receives.

In general, in operation 1116, the subscription provider creates new function instances 300 based on information discussed in operation 1114. While the function instances created in this operation exist on the same machine as the subscription provider 770 and requesting application 660, they represent resources identified through the publication and subscription mechanism described herein. Such resources may exist on other computers.

It will be appreciated by those skilled in the art that any response to the query of operation 1112 that conforms to the protocol or communication method in use can be employed by the subscription provider to obtain information from which function instances 300 may be generated, regardless of whether the response comes from a system that conforms to the definition of a publication server 610, as defined herein. For example, where the Web Service Discovery protocol is used, any valid Web Service Discovery response may provide information suitable for use by the subscription provider; the response does not need to come from a publication server and may come from another system the generates messages that conform to the Web Service Discovery protocol.

Finally, in operation 1118, in some implementations, the function instances 300 created by the subscription provider in operation 1116 are returned to the provider management module 778, then to function discovery module 652, then to the discovery interface module 776, and finally to the requesting application 660.

Those skilled in the art will realize that the subscription provider 770 may create the function instances and return them to the provider management module 778, or it may return the data necessary to create the function instances, and leave the actual creation of function instances to the provider management module or to the function discovery module 652.

It will also be realized that the subscription provider 770 may return function instances 300 or data asynchronously from the request for function instances. Also, the function instances created by the subscription provider may not be complete—that is, they may not contain all of the information required to be contained by a function instance. In such cases, the function discovery module 652, the provider management module 778, the discovery interface module 776, or another module, may supplement the data in the created function instances before the function instances are returned to the requesting application 660.

Figure 12:
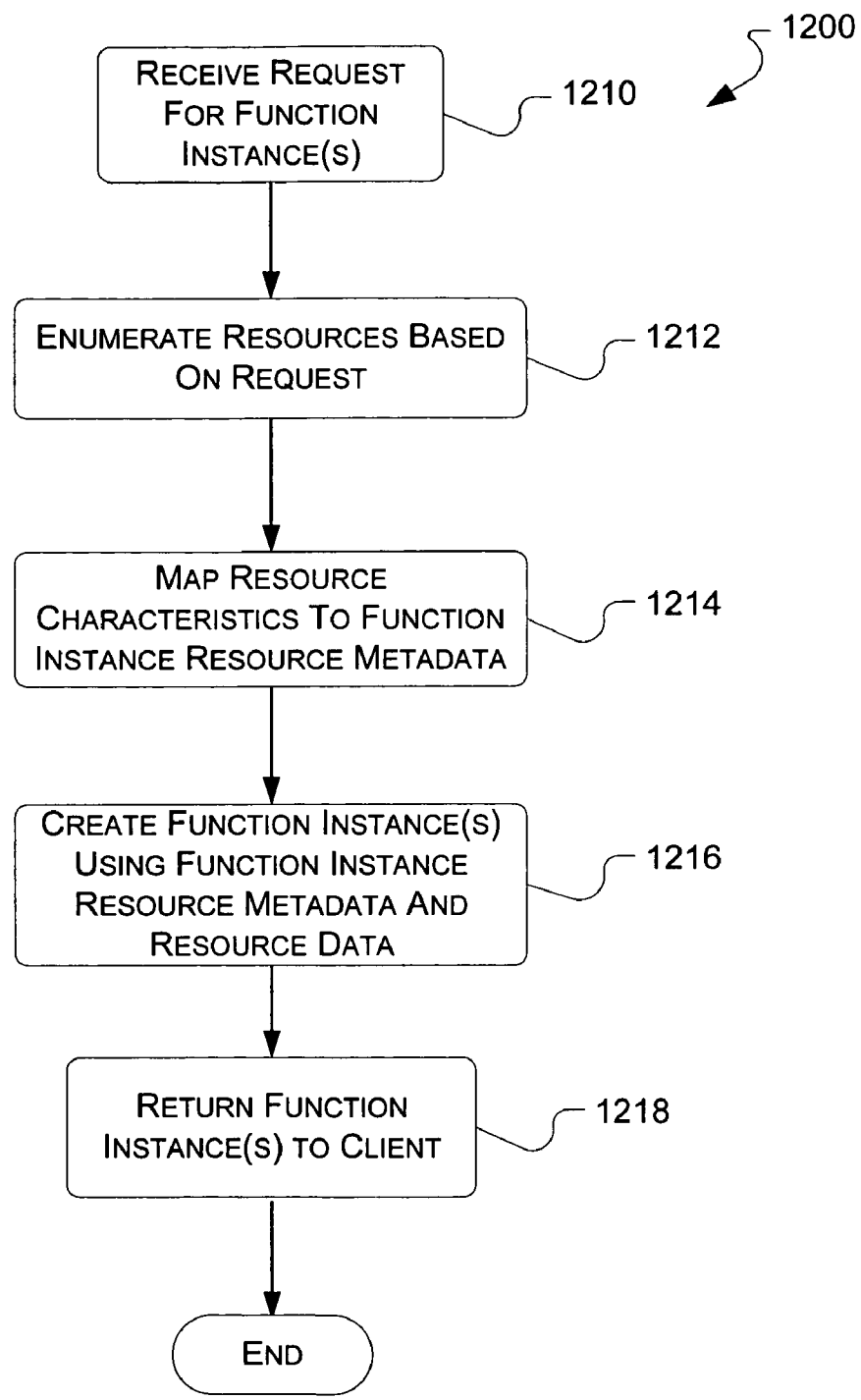
FIG. 12 illustrates a generalized operational flow including various operations that may be performed to service a request for function instances.

Turning now to FIG. 12, shown therein is a generalized operational flow 1200 including various operations that may be performed by a provider 214 to service a request for function instances. In particular, the operational flow 1200 illustrates operations that may be performed by a provider 214 to carry out the determination operation 1014 of operational flow 1000.

The following description of FIG. 12 is made with reference to the system 200 of FIG. 2, the API layer 400 of FIG. 4, and the tree structure of FIG. 5. In particular, the description of FIG. 12 is made with reference to the provider management module 228, the providers 214 and the resources 218. However, it should be understood that the operational flow described with respect to FIG. 12 is not intended to be limited to being performed by the provider management module 228, the providers 214, or the resources 218, and is also not intended to be limited to being associated with the system 200 of FIG. 2, the API layer 400 of FIG. 4, or the tree structure of FIG. 5. Additionally, it should be understood that while the operational flow 1200 indicates a particular order of operation execution, in other implementations the operations may be ordered differently.

In one implementation of operation 1210, a provider 214 receives a request for function instances. The request may include, but is not limited to, a subcategory that identifies a particular set of resources on which the returned function instances should be based; a tree enumeration flag that defines if only the specified subcategory should be searched, or if all descendant subcategories should also be searched; and filter criteria that specifies how returned function instances should be filtered.

In one implementation of operation 1212, the provider 214 enumerates the resources 218 with which it is associated and retrieves any information required to create function instances for such resources. The enumeration can in some cases be limited by the specified subcategory information and in the same or other cases can be limited by the specified filter criteria information.

The manner in which the provider 214 enumerates resources 218 varies depending on the nature of the resources with which the provider interacts. In some cases, the provider 214 may enumerate the resources and obtain information necessary to create function instances by using an application programming interface that is operable to manage the resources. For example and without limitation, a provider 214 for Plug and Play resources 218 may use the application programming interface known as SetupDi. Similarly, a provider for Simple Service Discovery Protocol resources may use a Universal Plug and Play application programming interface to find information about the available Universal Plug and Play or Simple Service Discovery Protocol resources, etc.

The mapped function instance provider 230 may use the tree structure 500 and API layer 400 data stored in the mapped function instance provider data 232 to create function instances. For example, if the mapped function instance provider is given a subcategory of "Subcategory A/Subcategory B," it may traverse the tree structure 500 to the node associated with subcategory B and then return function instances defined by the API layer(s) 400 associated with the node associated with subcategory AB.

Using the information retrieved in operation 1212, one implementation of operation 1214 maps the information to the organization and naming required by the function instance. This operation ensures that an application 210 using function instances 300 can retrieve the same information with a single name even if the underlying resources name that information differently. For example, and without limitation, information about the manufacturer of the resource could be represented by the resource-specific application programming interface using a data field called "ManufacturerName." This same information—the manufacturer—may be referred to in function instance resource metadata as "Manufacturer." In this example, operation 1214 transforms resource data retrieved from the resource so that it has the organization and name expected in function instance resource metadata.

In one implementation of operation 1216, the provider 214 creates function instances 300 for each resource identified by the request. The provider may create function instances using, among other things, the resource metadata containing mapped information generated in operation 1214, any activation information known or retrieved about the resource, and any other information required to create function instances.

Finally, in one implementation of operation 1218, the function instance(s) 300 the provider 214 has created are returned to the provider management module 228. It should be noted that the provider 214 might create the function instances and return them to the provider management module 228, or it might return the data necessary to create the function instances and leave the actual creation of the function instances to the provider management module 228, to the function discovery module 212, or to some other module. Also, the provider 214 might return function instances or data asynchronously from the request for function instances. In addition, not all of the information necessary to create a full and valid function instance may be provided by the provider 214. In such cases, the function instances 300 created by the provider might not be immediately usable by a requesting application 210. For example, the provider might not specify the value of the unique identification field 310; this information might instead be provided by the provider management module 228, by the function discovery module 212, or by some other module.

Figure 13:
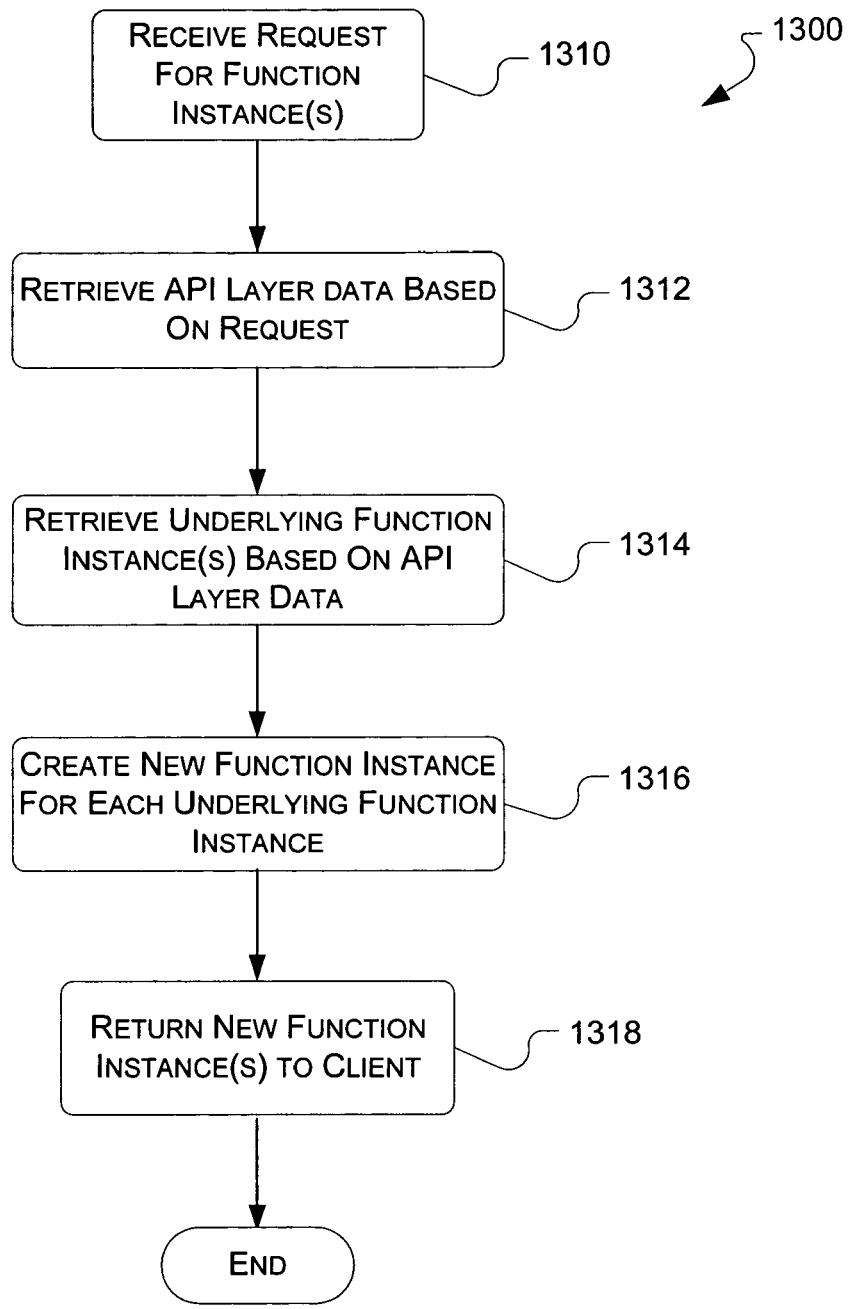
FIG. 13 illustrates a generalized operational flow including various operations that may be performed by a mapped function instance provider to service a request for function instances.

Turning now to FIG. 13, shown therein is a generalized operational flow 1300 including various operations that may be performed by a mapped function instance provider 230 to service a request for function instances 300. In particular, the operational flow 1300 illustrates operations that might be performed by a provider 214 to carry out the determination operation 1014 of operational flow 1000. The following description of FIG. 13 is made with reference to the system 200 of FIG. 2, the function instance 300 of FIG. 2, the API layer 400 of FIG. 4, and the tree structure 500 of FIG. 5. However, it should be understood that the operational flow described with respect to FIG. 13 is not intended to be limited to being performed by the system 200, the function instance 300, the API layer 400, or the tree structure 500. Additionally, it should be understood that while the operational flow 1300 indicates a particular order of operation execution, in other implementations the operations may be ordered differently.

In one implementation of operation 1310, a mapped function instance provider 230 receives a request for function instances. The request may include, but is not limited to, a subcategory that identifies a particular set of resources on which the returned function instances should be based; a tree enumeration flag that defines if only the specified subcategory should be searched, or if all descendant subcategories should also be searched; and filter criteria that specifies how returned function instances should be filtered.

In one implementation of operation 1312, the mapped function instance provider 230 first locates the appropriate node 512 in the tree structure 500 maintained in the mapped function instance provider data 232. For example, a request with subcategory information "Subcategory A/Subcategory B" may define a node 512 that is located at the end of the tree path starting with the root node 510, continuing through the node 512 for subcategory A, and terminating with the node 512 for subcategory B. Once this node is located, the mapped function instance provider retrieves all of the API layer 400 data associated with the node.

Then, for each API layer 400 retrieved in operation 1312, the mapped function instance provider executes operation 1314, which retrieves the function instances specified in the API layer 400. The mapped function instance provider locates the function instances using the category of underlying function instance(s) field 412 and subcategory of underlying function instance(s) field 414.

Additionally, the function instance provider may filter the returned function instances by specified function instance resource metadata property values, or by supported activation interfaces, or by some other data. For example, a subcategory named "Audio Hardware/Local" might have an API layer 400 with the category field "Plug and Play," the subcategory field "DevNode," and a filter on a particular Plug and Play property, so that only function instances 300 that reference audio resources are returned.

In some implementations, operation 1314 may be executed multiple times when there are multiple API layers 400 associated with the node 512. In this case, the set of retrieved function instances 300 may consist of all of the function instances returned as a result of the data in each API layer. This enables a single category to contain function instances that represent similar resources, even if the underlying function instances come from different providers, different categories, or different subcategories.

Next, one implementation of operation 1316 creates a new function instance for each function instance retrieved in operation 1314. This new function instance may contain a new value for the unique identification field 310 that is different from the value of the underlying function instance on which it is based. While the new function instance is based on the underlying function instance, it is not the same function instance, and so in some implementations warrants its own unique identifier.

The new function instance also contains function instance resource metadata that comprises both the resource metadata of the underlying function instance and the resource metadata from the API layer 400 and mapped function instance provider. For example, and without limitation, the resource metadata of the new function instance may contain a "Manufacturer" entry with information from the underlying function instance as well as a "Subcategory" entry that contains the subcategory where the API layer is located. The underlying function instance contains no information about the subcategory information associated with an API layer, but the mapped function instance provider can add this information when it creates the new function instance.

Finally, the new function instances created in operation 1316 may also contain activation data included in or referenced by the activation data field 314 and retrieved from the API layer 400. For example, and without limitation, suppose an API layer 400 with a supported interface field 418 that contains "Foo Interface" and a corresponding factory field 420 that defines an entity that can in turn create another entity that supports the Foo interface, based on the information in the function instance. Function instances created based on this API layer may contain activation data table 350 entries that denote that the function instance supports the Foo interface and define how to create an entity that implements the Foo interface.

The activation data created in operation 1316 may also contain activation information—in the form of specific interface and factory entries—from underlying function instances. This enables "API layering," where an API is defined in terms of another API. For example, and without limitation, suppose that an API layer contains category of underlying function instance(s) field 412, subcategory of underlying function instance(s) field 414, and filter criteria field 416 information that specifies that the underlying function instances (also provided by the mapped function instance provider) support the "Complex Interface."

The API layer that uses these underlying function instances could then contain a supported interface field 418 that denotes that the resulting function instances support the "Simple Interface." In this case, function instances returned as a result of data in this API layer contain activation data that indicates that they support both the Simple Interface and the Complex Interface.

Figure 14:
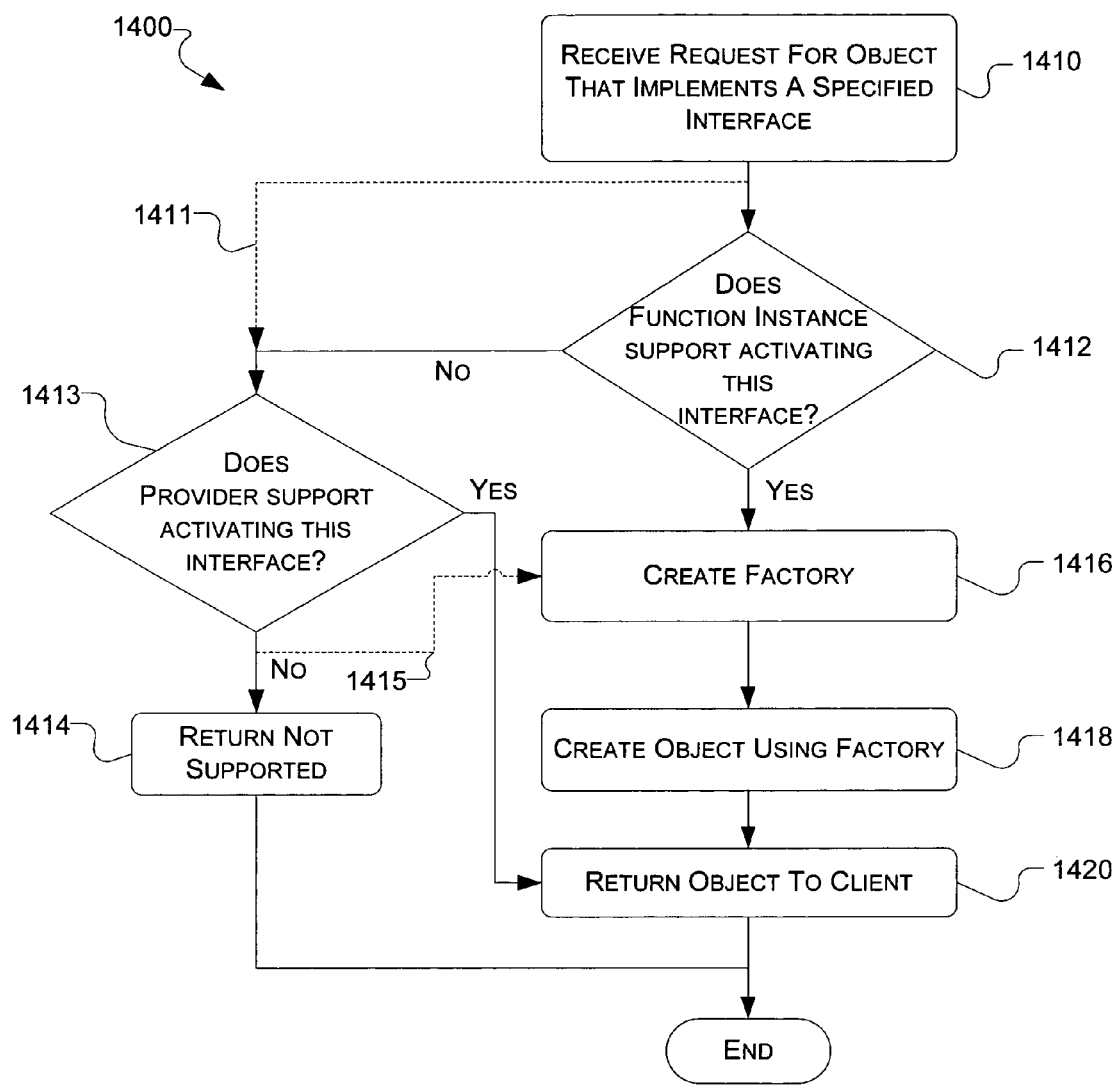
FIG. 14 illustrates a generalized operational flow including various operations that may be performed by a function instance in response to an activation request.

Turning now to FIG. 14, shown therein is a generalized operational flow 1400 including various operations that may be performed by a function instance in response to an activation request. The following description of FIG. 14 is made with reference to the system 200 of FIG. 2, the function instance 300 of FIG. 3, and the API layer 400 of FIG. 4. However, it should be understood that the operational flow described with respect to FIG. 14 is not intended to be limited to being performed by the system 200, the function instance 300, and the API layer 400. Additionally, it should be understood that while the operational flow 1400 indicates a particular order of operation execution, in other implementations the operations may be ordered differently.

In one implementation of operation 1410, a function instance 300 receives an activation request for an object that supports a specified application programming interface. Depending on the implementation of activation functionality, this request may include, but is not limited to, an interface that specifies the application programming interface the returned object supports, a factory identifier that identifies a factory object that can create an entity that supports the requested interface, and a set of additional data that, if provided, can be used by function instance to control or modify the activation. In some implementations, the request may contain a subset of this information. For example, an implementation that uses function instances where the activation data field 314 includes or references an activation data table 350 may, in some cases, not include the factory identifier. In such an implementation, factory information may be retrieved from the function instance itself.

In operation 1412, the function instance 300 determines if it supports activation for the requested interface. In one implementation, this test may be performed by examining the activation data table 350 for the presence of the requested interface, which, if supported, will exist in the interface column 352. In this implementation, if the interface does not exist in interface column 352, the function instance does not support activation for the specified application programming interface. In an alternate implementation, for example and without limitation, in one that does not use function instances that include or reference activation data table 350 information and instead uses factory information provided with the activation request, this test may not be performed and, in some implementations, operational flow 1400 may proceed from operation 1410 to operation 1413, as indicated by dotted line 1411.

If it is determined in operation 1412 that the function instance 300 supports activation for the requested application programming interface, the operational flow 1400 continues to operation 1416, described below. If it is determined in operation 1412 that the function instance does not support activation for the requested application programming interface, operational flow 1400 proceeds to operation 1413.

In operation 1413, the provider 214 associated with the function instance is queried to determine if the provider supports activating the requested application programming interface. In some implementations, the provider may be determined using function instance provider 351 data. If it is determined in operation 1413 that the provider supports activating the requested application programming interface, the provider creates an entity that implements the requested application programming interface. The operational flow 1400 then continues to operation 1420, described below. If it is determined that the provider does not support activation for the requested application programming interface, operational flow 1400 proceeds to operation 1414. In an alternate implementation, for example and without limitation, in one that does not use function instances that include or reference activation data table 350 information and instead uses factory information provided with the activation request, operational flow 1400 may proceed to operation 1416, as indicated by dotted line 1415.

In operation 1414, the activation request indicates that the specified application programming interface is not supported by the function instance 300 or provider 214.

If the function instance 300 supports activation for the requested application programming interface, or, in some implementations, if the factory to be used is identified in the activation request, operational flow 1400 continues to operation 1416, where, in one implementation, the function instance creates an instance of a factory associated with the specified application programming interface. In an implementation using the activation data table 350, the factory column 354 contains an identifier for a factory that creates entities that implement the requested interface. For example and without limitation, the factory column 354 in a COM-based system could contain a CLSID that uniquely identifies a COM object that can create instances of another COM object that actually implements the requested interface. Alternatively, and again without limitation, in a NET or Java-based system the factory column 354 could contain a fully qualified object or path hierarchy that identifies a NET or Java object that can create another object that implements the specified interface. In a non-object-oriented system the factory column 354 could contain an identifier that specifies how to create some entity that can in turn create another entity that implements the requested application programming interface. In an implementation that uses factory information provided with the activation request, the factory information provided with the activation request may be used to create the factory that can create entities that implement the requested interface.

In one implementation of operation 1418, the factory created in operation 1416 is used to create an entity that implements the requested interface. The factory has access to the data associated with the function instance—like the resource metadata—as well as possibly to other data, like additional parameters included in the activation request. Using this data, the factory can create an entity that implements the requested interface.

For example, and without limitation, suppose a function instance represents Plug and Play audio hardware, such as a sound card, and suppose that the activation data denotes that the function instance supports an "Audio" COM interface. In one implementation, a factory object that supports creating COM objects that implement the Audio interface might use the Plug and Play SetupDi API to create an object that implements the Audio interface. Such a factory object could use the resource-specific information in the function instance 300—like an identifier that specifies which audio hardware the function instance represents—to assist in creating the object that implements the Audio interface.

It should be noted that while this description refers to a factory and to factories creating entities which in turn create other entities that implement the requested application programming interface, that the function instance 300 could refer directly to the entity that implements the application programming interface. In addition, the same entity that implements the factory may also implement the application programming interface.

Finally, in operation 1420, the entity implementing the requested application programming interface is returned to the requester. Continuing with the example introduced in the previous paragraph, and without limitation, the COM object that implements the Audio interface would be returned to the application 210, which could then use it to control and interact with the audio hardware to, for example, play audio or control volume.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

What is claimed is:

1. A method, executing within a computer having a processor, comprising:
   receiving, at a publication service executing on a publication server and received from a publication application executing on the publication server, data associated with a plurality of function instances,
      each function instance associated with a resource at the publication server, at least two of the resources associated with the plurality of function instances being disparate types of resources,
      each of the plurality of function instances containing a resource metadata field and an activation field;
   receiving, at the publication service and received from a client, the client being a publication client, a request for resource information associated with at least one of the resources associated with at least one of the plurality of function instances; and
   in response to the request from the client, sending by the publication service and sent to the client, a one or more publish messages based on the received data, the one or more publish messages including the received data associated with the at least one of the resources associated with the at least one of the plurality of function instances.

2. The method of claim 1, further comprising:
   after receiving removal data associated with at least one of the plurality of function instances,
   sending, by the publication service and sent to the client, one or more unpublish messages, the one or more unpublish messages notifying the client that the at least one of the plurality of function instances is no longer available at the publication service.

3. The method of claim 1, further comprising:
   after receiving change data associated with at least one of the plurality of function instances, the change data indicating a change in the at least one of the plurality of function instances,
   sending, by the publication service and sent to the client and in response to the change data, a change message including new data for the at least one of the plurality of function instances.

4. The method of claim 1, further comprising:
   sending, by the publication service and sent to the client, a second publish message based on the received data to the client, the second publish message initiated by the publication service without responding to a request from the client.

5. The method of claim 1, wherein the received data is generated by a mapped function instance provider that uses mapped function instance provider data.

6. The method of claim 1, wherein the one or more publish messages include a network location of the resource.

7. One or more computer readable storage media embodying executable instructions that, when executed, implement the method of claim 1.

8. The method of claim 1 further wherein each function instance further contains a unique identifier, the unique identifier remaining constant even when the publication server is stopped and restarted.

9. The method of claim 1 further comprising:
   receiving, at the publication service and received from the client, a first request to obtain an Application Programming Interface (API) for a first function instance of the plurality of function instances, the first request to obtain the API including at least a portion of the resource metadata associated with the first function instance;
   creating a first instance of the API, in response to the first request to obtain the API, using the at least a portion of the resource metadata associated with the first function instance, the first instance of the API used to interact with and control the resource associated with the first function instance; and
   providing, to the client, the first instance of the API.

10. The method of claim 9 further comprising:
    receiving, at the publication service and received from the client, a second request to obtain the API for a second function instance of the plurality of function instances, the second request to obtain the API including at least a portion of the resource metadata associated with the second function instance, the resource associated with the first function instance and the resource associated with the second function instance being disparate types of resources;
    creating a second instance of the API, in response to the second request to obtain the API, using the at least a portion of the resource metadata associated with the second function instance, the second instance of the API used to interact with and control the resource associated with the second function instance, the interaction with and control of the resource associated using the first instance of the API and the interaction with and control of the resource associated with the second instance of the API being in the same manner; and
    providing, to the client, the second instance of the API.

11. The method of claim 9 wherein:
    the activation field of the first function instance includes an activation table that contains indicia of one or more APIs that can be requested by the client,
    the first request to obtain the API for the first function instance of the plurality of function instances includes indicia of at least one of the one or more APIs that can be requested by the client, and
    the creating the first instance of the API creates the API corresponding to at least one of the one or more indicia of the at least one or more APIs that can be requested by the client included in the first request.

12. The method of claim 11 wherein:
    the activation table included in the activation field of the first function instance includes an indicia of one or more factories that can create entities that implement the one or more APIs that can be by requested by the client,
    the first request to obtain the API for the first function instance of the plurality of function instances includes at least one indicia of the one or more factories that can create entities that implement the one or more APIs that can be requested by the client, and
    the creating the first instance of the API creates the API using at least one of the one or more factories corresponding to at least one indicia of the one or more factories that can create entities that implement the one or more APIs that can be requested by the client included in the first request.

13. The method of claim 1 further comprising:
    the publication application transforming metadata retrieved from at least one of the at least two resources so that it has the organization and name expected in function instance resource metadata, wherein the resource metadata fields of the plurality of function instances are identified in a consistent manner.

14. The method of claim 1 wherein the activation field in each of the plurality of function instances includes a function instance provider data that identifies a provider of the function instance, an activation data table that contains references to one or more Application Programming Interfaces (APIs) that can be requested by the client, and reference to one or more factories that can create entities that implement the requested APIs.

15. A method, executing within a computer having a processor, comprising:

receiving, at a function discovery module executing on a client and received from an application executing on the client, a request for one or more function instances, the client being a publication client;

creating, by the function discovery module in response to the request, the one or more function instances using resource information obtained from a publication service executing on a publication server, each of the one or more function instances associated with one of a plurality of resources at the publication server, at least two of the plurality of resources at the publication server being disparate types, each of the one or more function instances including a resource metadata field and an activation field, the activation field in each of the plurality of function instances includes a function instance provider data that identifies a provider of the function instance, an activation data table that contains indicia of one or more application Programming Interfaces (APIs) that can be requested by the client, and indicia of one or more factories that can create entities that implement the one or more APIs that can be requested by the client; and sending, by the function discovery module in response to the request, the one or more function instances to the application.

16. The method of claim 15, wherein creating the one or more function instances further comprises:

in response to a request from the application for an API associated with the one or more function instances, activating an API associated with the resource using the activation field.

17. The method of claim 15, further comprising:

receiving, by the function discovery module, notification of a change to the resource information; and sending, by the function discovery module and sent to the application, information about the change to the resource information.

18. The method of claim 15, wherein the one or more function instances represent varying types of resources and are supplied by a mapped function instance provider using mapped function instance provider data.

19. One or more computer-readable storage media embodying executable instructions that, when executed, implement the method of claim 15.

20. One or more computer readable storage medium embodying executable instructions that, when executed, implement a method, the method comprising:

receiving, at a publication service executing on a publication server and received from a publication application executing on the publication server, data associated with a plurality of function instances, each function instance associated with a resource at the publication server, at least two of the resources associated with the plurality of function instances being disparate types of resources, each of the plurality of function instances containing a resource metadata field and an activation field;

receiving, at the publication service and received from a client, the client being a publication client, a request for resource information associated with at least one of the resources associated with at least one of the plurality of function instances;

in response to the request from the client, sending by the publication service and sent to the client, a one or more publish messages based on the received data, the one or more publish messages including the received data associated with the at least one of the resources associated with the at least one of the plurality of function instances;

receiving, at the publication service and received from the client, a first request to obtain an Application Programming Interface (API) for a first function instance of the plurality of function instances, the first request to obtain the API including at least a portion of the resource metadata associated with the first function instance;

receiving, at the publication service and received from the client, a second request to obtain the API for a second function instance of the plurality of function instances, the second request to obtain the API including at least a portion of the resource metadata associated with the second function instance, the resource associated with the first function instance and the resource associated with the second function instance being disparate types of resources;

in response to the first request to obtain the API, creating a first instance of the API using the at least a portion of the resource metadata associated with the first function instance, the first instance of the API used to interact with and control the resource associated with the first function instance;

in response to the second request to obtain the API, creating a second instance of the API using the at least a portion of the resource metadata associated with the second function instance, the second instance of the API used to interact with and control the resource associated with the second function instance, the interaction with and control of the resource associated using the first instance of the API and the interaction with and control of the resource associated with the second instance of the API being in the same manner;

providing, to the client, the first instance of the API; and
providing, to the client, the second instance of the API.

* * * * *